(12) United States Patent  
Kitazato et al.

(10) Patent No.: US 8,797,460 B2  
(45) Date of Patent: Aug. 5, 2014

(54) RECEPTION APPARATUS, RECEPTION METHOD, AND PROGRAM

(75) Inventors: Naohisa Kitazato, Tokyo (JP); Yoshiharu Dewa, Tokyo (JP); Izumi Hatakeyama, Tokyo (JP); Masayuki Obayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 13/443,690

(22) Filed: Apr. 10, 2012

(65) Prior Publication Data

US 2012/0281141 A1 Nov. 8, 2012

(30) Foreign Application Priority Data

May 6, 2011 (JP) ................................. 2011-103556

(51) Int. Cl.  
*H04N 5/44* (2011.01)

(52) U.S. Cl.  
USPC ........... 348/553; 348/555; 348/563; 348/564; 348/565; 348/580; 348/581; 348/584; 348/729; 348/731; 725/37; 725/38; 725/39; 725/32; 725/44; 725/86; 725/105; 725/110; 725/135

(58) Field of Classification Search  
USPC ......... 348/553, 552, 555, 563, 564, 565, 580, 348/581, 584, 729, 731; 725/37, 38, 39, 32, 725/44, 86, 105, 110, 135  
See application file for complete search history.

(56) References Cited

U.S. PATENT DOCUMENTS

| | | | |
|---|---|---|---|
| 7,555,199 B2* | 6/2009 | Horie et al. | 386/291 |
| 7,904,930 B2* | 3/2011 | Dhodapkar et al. | 725/86 |
| 8,572,653 B2* | 10/2013 | Kim et al. | 725/44 |
| 2002/0059624 A1* | 5/2002 | Machida et al. | 725/91 |
| 2003/0177501 A1* | 9/2003 | Takahashi et al. | 725/110 |
| 2004/0017513 A1* | 1/2004 | Takahashi | 348/552 |
| 2004/0107449 A1* | 6/2004 | Fukuda et al. | 725/135 |
| 2004/0156620 A1* | 8/2004 | Horie et al. | 386/83 |
| 2005/0257130 A1* | 11/2005 | Ito | 715/500.1 |
| 2006/0290817 A1* | 12/2006 | Yui et al. | 348/564 |
| 2007/0118850 A1* | 5/2007 | Bertin | 725/32 |
| 2008/0030618 A1* | 2/2008 | Okamoto et al. | 348/553 |
| 2008/0077965 A1* | 3/2008 | Kamimaki et al. | 725/105 |
| 2009/0009511 A1* | 1/2009 | Ueda et al. | 345/419 |
| 2009/0025030 A1* | 1/2009 | Kasutani | 725/38 |
| 2009/0228921 A1* | 9/2009 | Miki et al. | 725/38 |

FOREIGN PATENT DOCUMENTS

JP 2009-180892 8/2009

* cited by examiner

*Primary Examiner* — Jefferey Harold  
*Assistant Examiner* — Mustafizur Rahman  
(74) *Attorney, Agent, or Firm* — Sherr & Jiang, PLLC

(57) ABSTRACT

A reception apparatus includes: a reception unit configured to receive a broadcast stream at least including a data stream for data broadcasting; a first style selector configured to select a display style for each of data broadcast content acquired from the broadcast stream received by the reception unit; a second style selector configured to select, when the data broadcast content corresponding to the style selected by the first style selector corresponds to a plurality of display styles, one display style out of the plurality of display styles; and a display unit configured to display the data broadcast content corresponding to the style selected by the first style selector or the second style selector.

13 Claims, 35 Drawing Sheets

Video content

Data broadcast content

Portable telephone
(vertically long display)

Portable telephone
(horizontal long display)

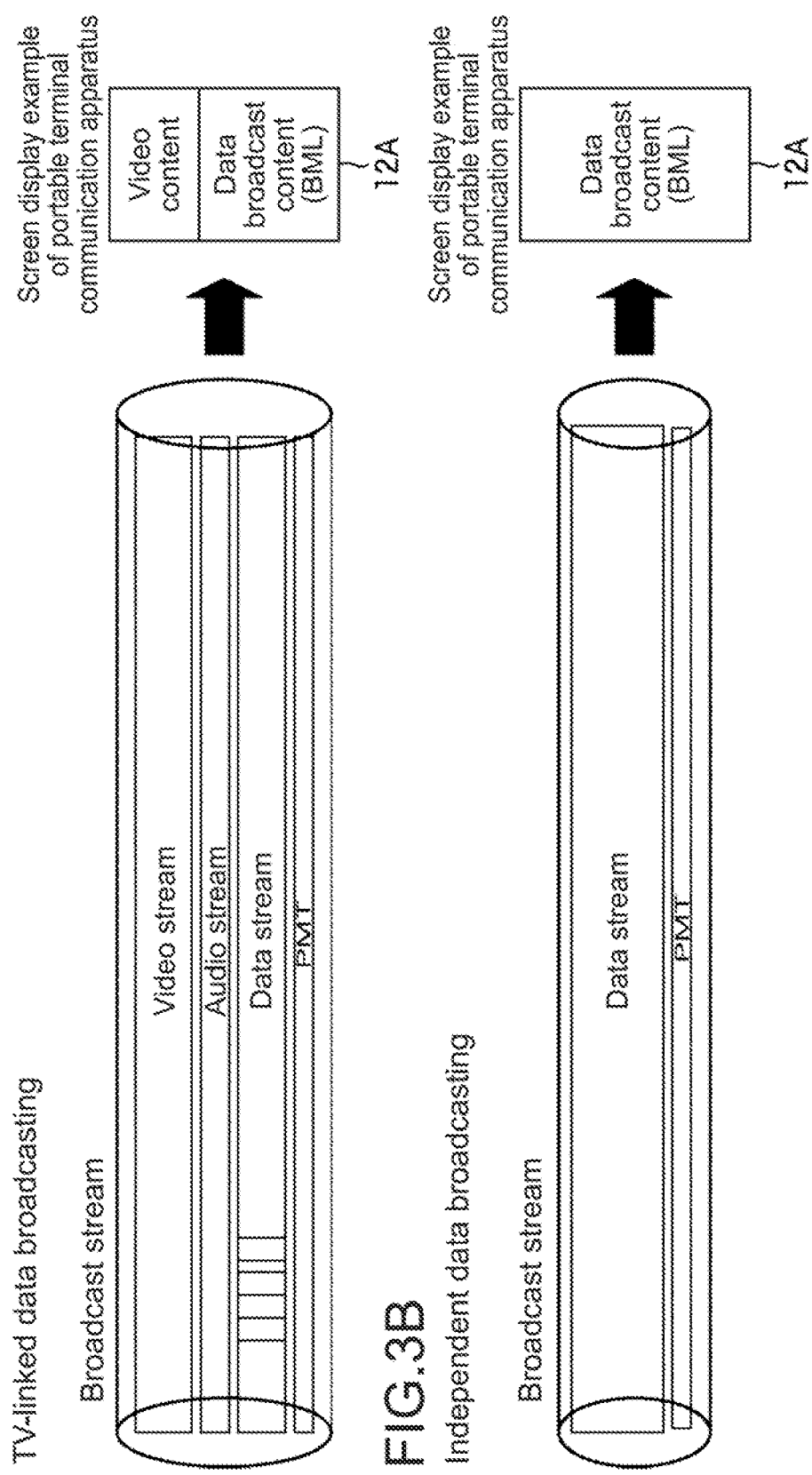

TV-linked data broadcasting
(vertically long display)

Independent data broadcasting
(vertically long display)

TV-linked data broadcasting
(horizontal long display)

Independent data broadcasting
(horizontal long display)

Overlay arrangement

Separate arrangement

QVGA (horizontal long display)

QVGA (vertical long display)

VGA (horizontal long display)

VGA (vertical long display)

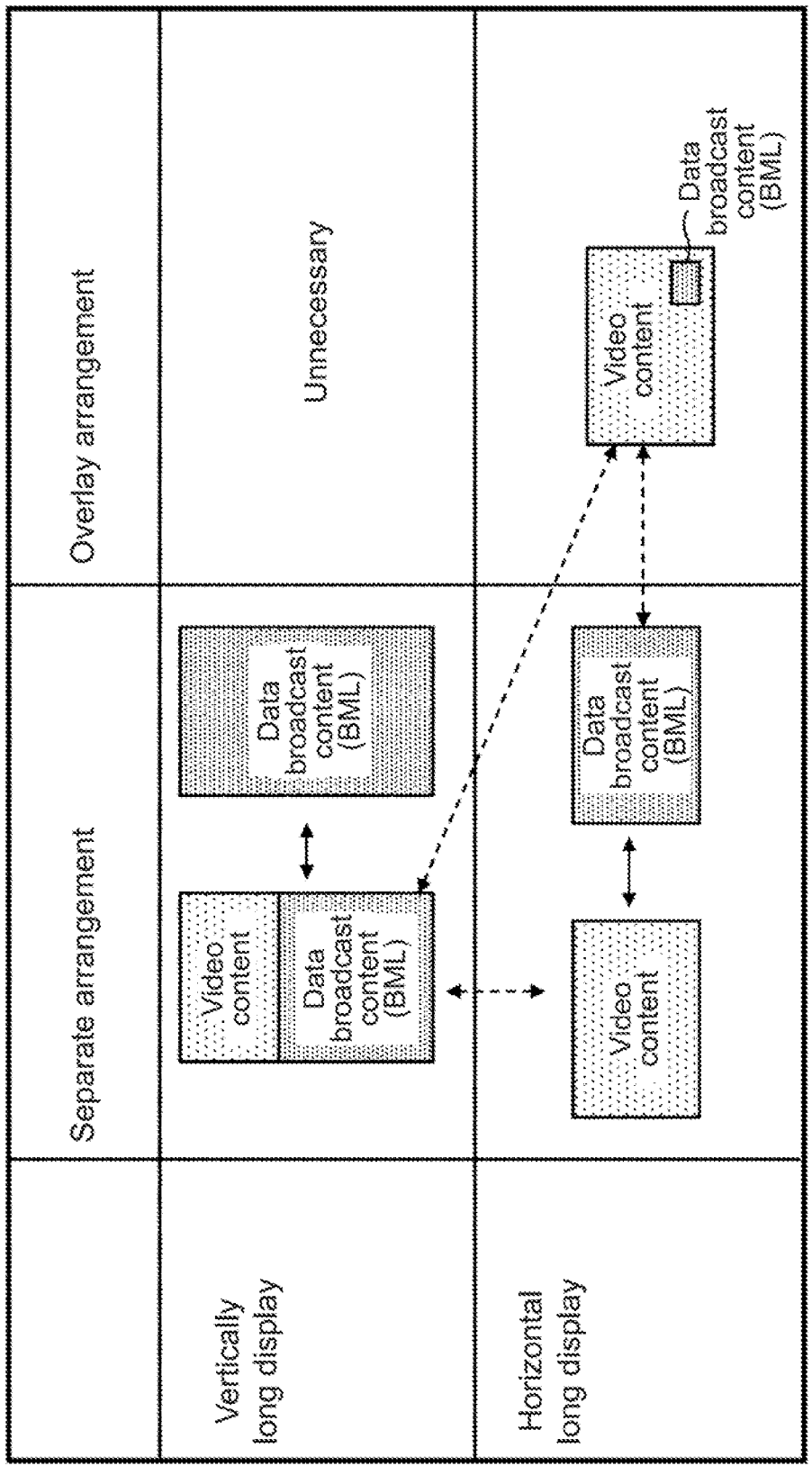

FIG.8

|  | Separate arrangement | Overlay arrangement |
|---|---|---|
| Vertically long display | Data broadcast content (BML) | Unnecessary |
| Horizontal long display | Data broadcast content (BML) | Unnecessary |

|  | a | b | c | d | e | f |
|---|---|---|---|---|---|---|
| Portable telephone | ① | | | | | |
| Smart phone A (vertically long display) | ② | ③ | | ① | | |
| Smart phone A (horizontal long display) | ⑥ | ④ | ② | ⑤ | ③ | ① |
| Smart phone B (vertically long display) | ① | | | ② | | |
| Smart phone B (horizontal long display) | | ② | | | ① | |
| Tablet PC | ④ | ③ | | ② | ① | |

Style a: QVGA, vertical long display, separate arrangement
Style b: QVGA, horizontal long display, separate arrangement
Style c: QVGA, horizontal long display, overlay arrangement
Style d: VGA, vertical long display, separate arrangement
Style e: VGA, horizontal long display, separate arrangement
Style f: VGA, horizontal long display, overlay arrangement

FIG.9

Style selection function
  selectStyleOfContent()
Grammar
  Number selectStyleOfContent (input Number style_avilability)
Argument
  style_avilability    Bitmap indicating availability to provide each style
Return value
  Selected style number   Success
  null                    Failure
Explanation
  Whether or not content for each document style as follows is provided is designated
  by style_availability
    style_availability bit0 QVGA(240 x 480), Usability of vertically-long display, separate arrangement
    style_availability bit1 QVGA(320 x 480), Usability of horizontally-long display, separate arrangement
    style_availability bit2 QVGA(240 x 240), Usability of vertically-long display, overlay arrangement
    style_availability bit3 VGA(480 x 960) , Usability of vertically-long display, separate arrangement
    style_availability bit4 VGA(640 x 960) , Usability of horizontally-long display, separate arrangement
    style_availability bit5 VGA(640 x 480) , Usability of horizontally-long display, overlay arrangement The portable terminal communication apparatus selects one of provided styles, which is usable
in view of terminal ability, setting, and state, and returns it as a style number (bit number above)
corresponding to an arrangement order of style_availability above. Further, in case where no
usable style is present, the portable terminal communication apparatus returns null.

FIG.13

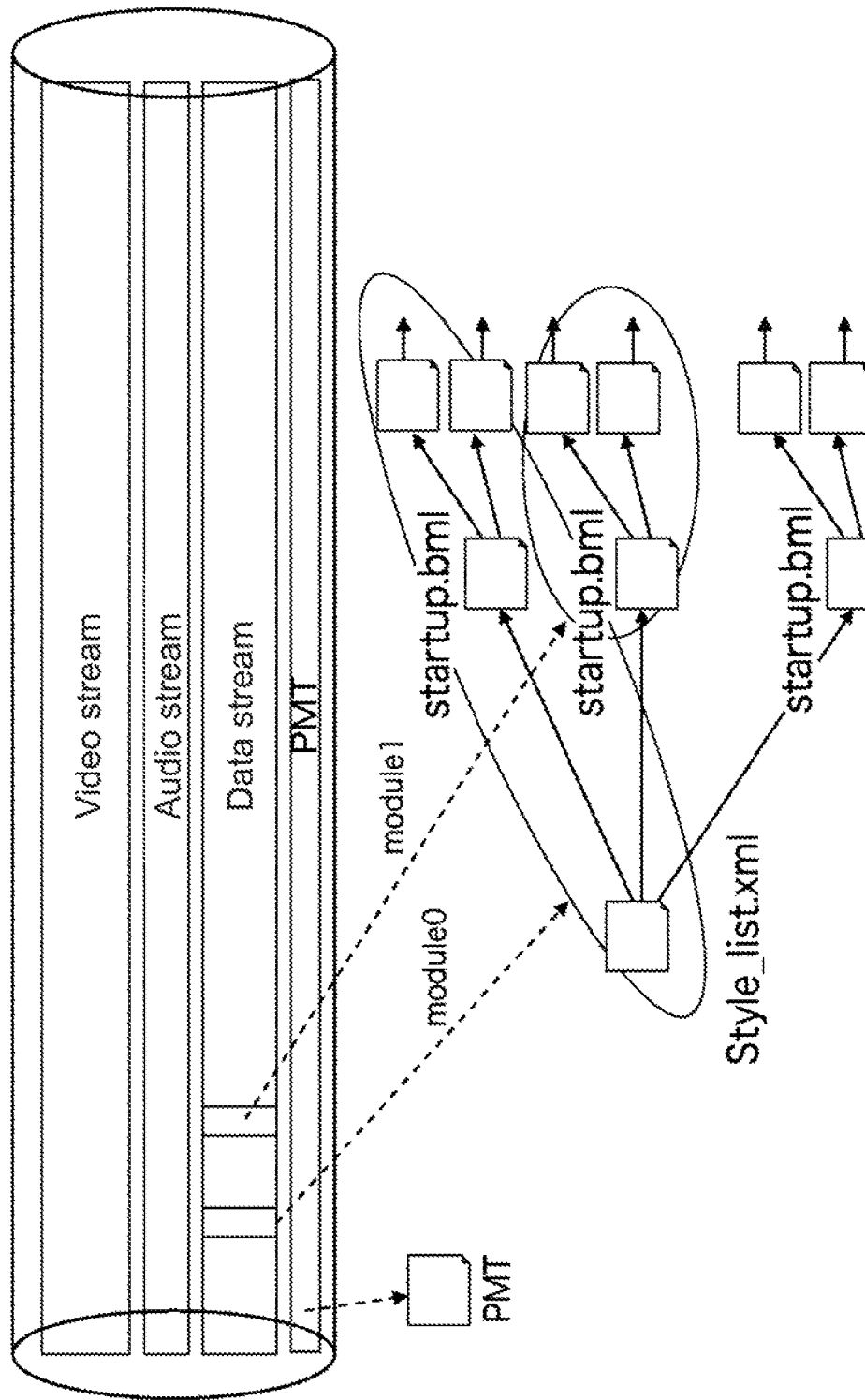

FIG.18

| Element (attribute) | | Number of appearances | Definition and detailed operation |
|---|---|---|---|
| style_list | | 1 | |
| | provided_style | 1..N | |
| | @horizontal_size | 1 | Data broadcast plane horizontal size (number of pixels) |
| | @vertical_size | 1 | Data broadcast plane vertical size (number of lines) |
| | @layout_policy | 1 | "separated", "overlaid" |
| | @link | 1 | Data-broadcast-content first-page URL |

Description example

```
<style_list>
  <provided_style horizontal_size="240" vertical_size="480" layout_polcy="separated"
    link="startup.bml"/>
  <provided_style horizontal_size="640" vertical_size="960" layout_polcy="separated"
    link="../1/startup.bml"/>
  <provided_style horizontal_size="640" vertical_size="480" layout_polcy="overlaid"
    link="http://providerA.com/databroadcast/startup.bml>
</style_list>
```

FIG.22

```
data_broadcast_style_list_descriptor(){
    descriptor_tag                              8
    descriptor_length                           8
    number_of_style                             6
    for( j=0;i<number_of_style;i++) {
        style_id                                4
        reserved                                4
        module_id                               8
    }
}
```

Description example

`<link rel="stylesheet" type="text/css" href="tate.css" media="portlait, separated">`

FIG.26

```
<!DOCTYPE html PUBLIC "-//ARIB//DTD XHTML BML 12.0//JA"
 "http://www.arib.or.jp/B24/DTD/bml_12_0.dtd">
<html>
<head>
 ... snip ...
<link rel=stylesheet type="text/css" href="style_f.css" media=landscape, overlaid>
<link rel=stylesheet type="text/css" href="style_a.css" media=portrait, separated>
<link rel=stylesheet type="text/css" href="style_e.css" media=landscape, separated >
</head>
<body>
<p style="color: green">while the paragraph is green.</p>
</body>
</html>
```

| Contents of style_f.css | Contents of style_a.css | Contents of style_e.css |
|---|---|---|
| body {width: 640px; height: 480px; } | body {width: 240px; height: 480px; } | body {width: 640px; height: 960px; } |

FIG.29

```
<!DOCTYPE html PUBLIC "-//ARIB//DTD XHTML BML 12.0//JA"
"http://www.arib.or.jp/B24/DTD/bml_12_0.dtd">
<html>
<head>
... snip ...
<meta http-equiv="content-style-type" content="text/css">
<style type="text/css">
<!-- @import url(port-over.css) portlait, overlaid;
     @import url(land-separate.css) landscape, separated;
     @import url(port-land-over.css) portlait, landscape, overlaid;
-->
</style>
</head>
<body>
<p style="color: green">while the paragraph is green.</p>
</body>
</html>
```

Description example

```
@media portlait {
/*Vertically-long display style definition*/
body { font: 10pt serif } }
@media landscape {
/*Horizontally-long display style definition*/
body { font: 12pt sans-serif } }
@media portlait,landscape{
/*Common style definition in vertically-long display and horizontally-long display*/
body { line-height: 1.2 } }
```

```
<!DOCTYPE html PUBLIC "-//ARIB//DTD XHTML BML 1 2.0//JA"
    "http://www.arib.or.jp/B24/DTD/bml_12_0.dtd">
<html>
<head>
    ⋮
<meta http-equiv="content-style-type" content="text/css">
<style type="text/css">
<!-- @media landscape, overlaid {
    /*Horizontally-long display and overlay arrangement style definition*/
    body {width: 640px;
          height: 480px;}
    }
    @media landscape, separated {
    /*Horizontally-long display and separate arrangement style definition*/
    body {width: 640px;
          height: 960px;}
    }
    @media portrait, separated {
    /*Vertically-long display and separate arrangement style definition*/
    body {width: 240px;
          height: 480px;}
    }
-->
</style>
</head>
<body>
<p style="color: green">while the paragraph is green.</p>
</body>
</html>
```

FIG.32

RECEPTION APPARATUS, RECEPTION METHOD, AND PROGRAM

BACKGROUND

The present technology relates to a reception apparatus, a reception method, and a program. In particular, the present technology relates to a reception apparatus, a reception method, and a program, that are capable of performing screen display in an optimal display mode.

Portable communication terminal apparatuses such as a portable telephone and a portable information terminal have been enhanced in performance and have become multi-functional. With an enhancement in performance of the portable communication terminal apparatuses, the number of functions that can be used in the portable communication terminal apparatuses, for example, so-called one-segment broadcasting, has also been increased. In digital broadcasting services including the one-segment broadcasting and the like, data broadcasting is performed as well as television broadcasting.

In the portable telephones being main targets for the one-segment broadcasting, from the past, display sections for vertically long display predominate. Therefore, as shown in FIG. 1C, these portable telephones are suitable for displaying video content (FIG. 1A) and data broadcast content (FIG. 1B) at the same time. On the other hand, as shown in FIG. 1D, in the case of a display section for horizontally long display, the screen display is too small to view the video content and browse the data broadcast content. In many cases, only the video content (FIG. 1A) is displayed and the data broadcast content (FIG. 1B) is not used.

In recent years, the modes of the display sections of the portable communication terminal apparatuses such as the portable telephone are diversified. For example, there are used one having a display section envisaged to be used for horizontally long display, and one having a higher resolution.

In the case of data broadcasting having a fixed mode to be displayed on a screen, it is not possible to correspond to a screen display state of the display section having the diversified modes, for example, the horizontally long display and display with a VGA resolution, which does not comply with the current situation. Therefore, it is desirable to change a display mode of data broadcast content in accordance with a screen display state of a display section.

Further, a portable information apparatus that changes screen display of a display section by switching video signals depending on various modes is disclosed (e.g., see Japanese Patent Application Laid-open No. 2009-180892).

SUMMARY

However, in the technique in related art, a display mode of data broadcast content to be displayed on the display section is fixed, and thus the data broadcast content may not correspond to a screen display state of the display section of the portable communication terminal apparatuses, that has the diversified modes.

In view of the above circumstances, there is a need for performing screen display in an optimal display mode by changing a display mode of data broadcast content in accordance with a screen display state of a display section.

A reception apparatus according to an embodiment of the present technology includes a reception unit configured to receive a broadcast stream at least including a data stream for data broadcasting, a first style selector configured to select a display style for each of the data broadcast content acquired from the broadcast stream received by the reception unit, a second style selector configured to select, when the data broadcast content corresponding to the style selected by the first style selector corresponds to a plurality of display styles, one display style out of a plurality of display styles, and a display unit configured to display the data broadcast content corresponding to the style selected by the first style selector or the second style selector.

The first style selector selects the display style for each of the data broadcast content, using any one method of a script method of selecting the style by executing a script described in a file to be first read out from the data stream, a metafile method of selecting the style from a list of styles described in a metafile that is acquired from the data stream, and a signaling method of selecting the style from a list of styles acquired from a stream for transmission control information that is included in the broadcast stream. The second style selector selects the one display style out of the plurality of display styles, using any one method of a link method of selecting the style by using information on screen display that is acquired from an external file being at a link destination designated in a description language of the data broadcast content being displayed, an import method of selecting the style by using information on screen display that is acquired from an external file imported in accordance with a predetermined rule in the description language, and a medium method of selecting the style by using information on screen display that is defined by a predetermined rule in the description language.

The first style selector selects the display style for each of the data broadcast content in accordance with a screen display direction or screen display setting of the display unit when a channel of the video content that is acquired from a video stream included in the broadcast stream is selected.

The first style selector selects the one display style out of the plurality of display styles selectable in accordance with a priority set in advance.

The screen display direction is either vertically long display in which the screen display of the display unit is vertically long or horizontally long display in which the screen display of the display unit is horizontally long.

The screen display setting is setting of an arrangement method for the content, by which either separate arrangement in which the video content and the data broadcast content are separately arranged or overlay arrangement in which the video content and the data broadcast content are arranged in an overlaid state is set.

The second style selector selects, when a screen display state of the display unit is changed, the one display style out of the plurality of display styles to which the data broadcast content being displayed corresponds.

The second style selector selects, when the screen display direction or the screen display setting of the display unit is changed, the one display style out of the plurality of display styles to which the data broadcast content being displayed corresponds, in accordance with the screen display direction or the screen display setting of the display unit.

The screen display direction is either vertically long display in which the screen display of the display unit is vertically long or horizontally long display in which the screen display of the display unit is horizontally long.

The screen display setting is setting of an arrangement method for the content, by which either separate arrangement in which video content and the data broadcast content are separately arranged or overlay arrangement in which the video content and the data broadcast content are arranged in an overlaid state are set, the video content being acquired from the video stream included in the broadcast stream.

The broadcast stream is an MPEG-TS (Moving Picture Experts Group 2-Transport Stream), and the list of styles in the signaling method is acquired from a PMT (Program Mapped Table) included in the stream for transmission control information.

The reception apparatus may be an independent apparatus or may be internal blocks constituting a single apparatus.

A reception method or program according to an embodiment of the present technology is a method or program corresponding to the above-mentioned reception apparatus according to the embodiment of the present technology.

In the reception apparatus, reception method, and program according to the embodiment of the present technology, the broadcast stream at least including the data stream for data broadcasting is received. The display style for each of the data broadcast content acquired from the received broadcast stream is selected. When the data broadcast content corresponding on the selected style corresponds to the plurality of display styles, one display style is selected out of the plurality of display styles. The data broadcast content corresponding on the selected style is displayed.

According to the embodiments of the present technology, it is possible to perform screen display in an optimal display mode.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 3 are diagrams for illustrating TV-linked data broadcasting and independent data broadcasting;

FIG. 7 is a diagram showing relationships between display modes and arrangements in the TV-linked data broadcasting;

FIG. 8 is a diagram showing relationships between display modes and arrangements in the independent data broadcasting;

FIG. 9 is a diagram showing relationships between style correspondences and priorities in each portable terminal communication apparatus;

FIG. 13 is a diagram showing an example of a style selection function;

FIG. 17 is a diagram showing a configuration of a broadcast stream in a metafile method;

FIG. 18 is a diagram showing an example of a format of a metafile;

FIG. 22 is a diagram showing an example of a data broadcast style list descriptor;

FIG. 26 is a diagram showing a description example of a BML document in the link method;

FIG. 29 is a diagram showing a description example of a BML document in the import method;

FIG. 32 is a diagram showing a description example of a BML document in the medium method;

DETAILED DESCRIPTION OF EMBODIMENTS

Figure 1A:
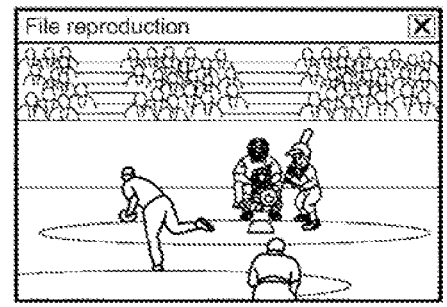
FIG. 1 are diagrams each showing a display example of data broadcasting in one-segment broadcasting.
Figure 1B:
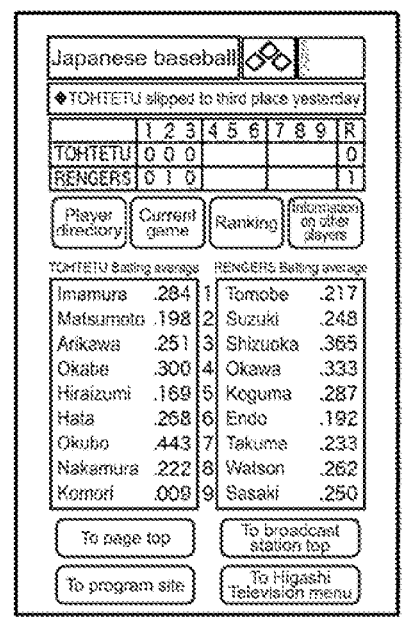
Figure 1C:
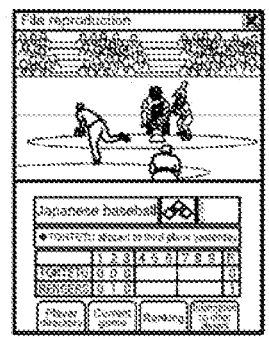
Figure 1D:
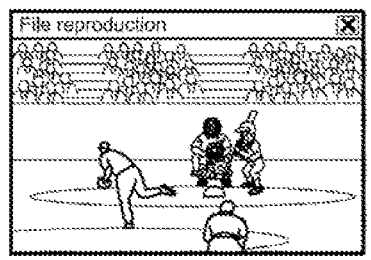

Hereinafter, referring to the drawings, embodiments of the present technology will be described.

[Configuration Example of Broadcasting System]

Figure 2:
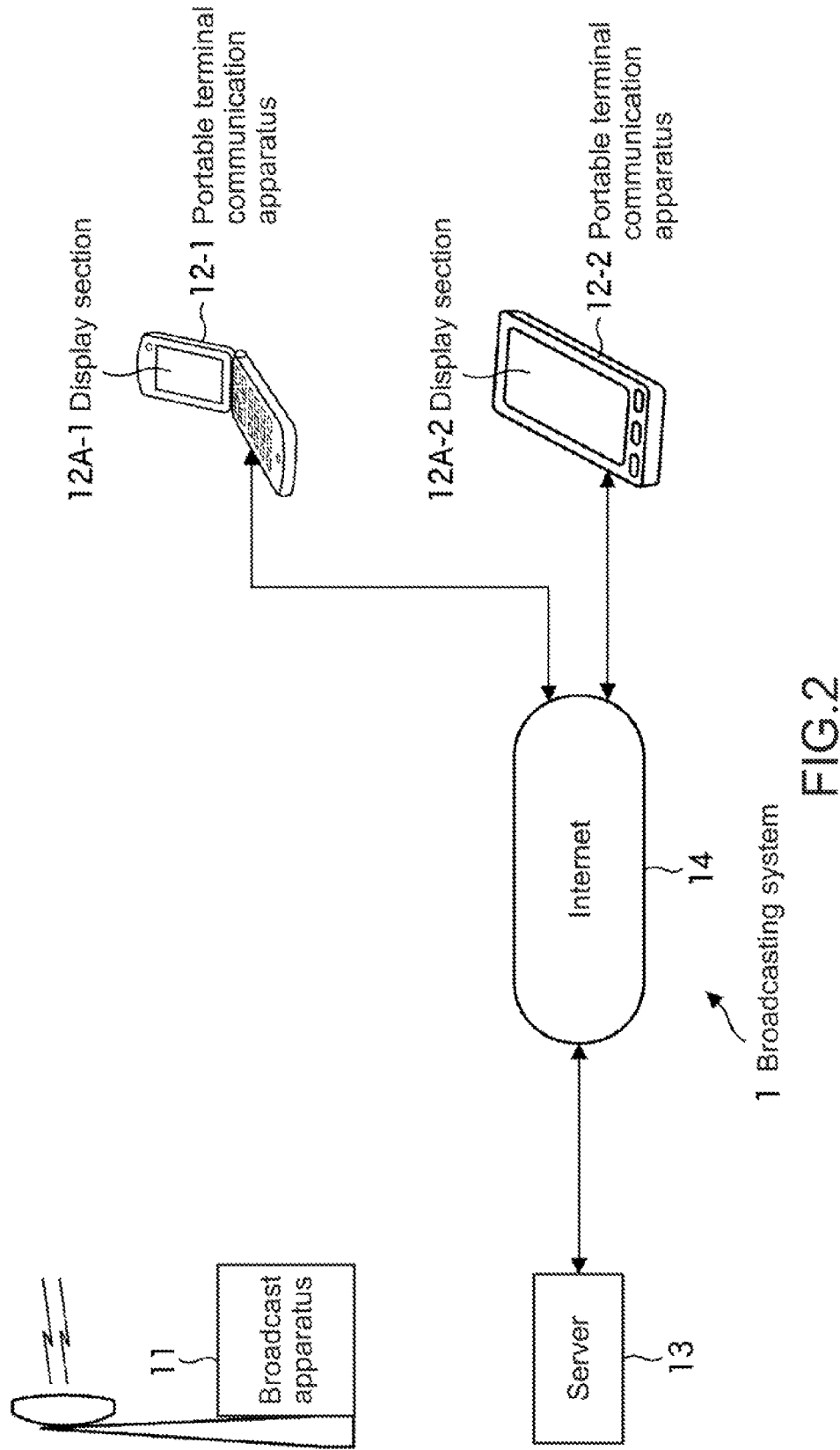
FIG. 2 is a diagram showing a configuration example of a broadcasting system.

FIG. 2 is a diagram showing a configuration example of a broadcasting system.

A broadcasting system 1 is constituted of a broadcast apparatus 11, a portable terminal communication apparatus 12-1, a portable terminal communication apparatus 12-2, and a server 13.

The broadcast apparatus 11 is provided at a broadcast station, and sends a broadcast stream in which a video stream, an audio stream, and a data stream are multiplexed, as a digital television broadcast signal.

The portable terminal communication apparatus 12-1 and the portable terminal communication apparatus 12-2 are portable terminal communication apparatuses, for example, a portable telephone and a smart phone, each of which is held by each user.

The portable terminal communication apparatus 12-1 receives the digital television broadcast signal sent from the broadcast apparatus 11, and outputs a video and an audio obtained from a broadcast stream in a certain channel.

Specifically, the portable terminal communication apparatus 12-1 includes a display section 12A-1. On the display section 12A-1, video content obtained from the video stream and data broadcast content obtained from the data stream are displayed.

Further, the portable terminal communication apparatus 12-1 accesses the server 13 via an Internet 14 to receive data broadcast content, and display it on the display section 12A-1.

Similar to the portable terminal communication apparatus 12-1, the portable terminal communication apparatus 12-2 receives the data broadcast content from the broadcast apparatus 11 or the server 13, and displays it on a display section 12A-2 in a mode different from that of the display section 12A-1.

The server 13 records the data broadcast content corresponding to the video content broadcast by the broadcast apparatus 11. The broadcast apparatus 11 provides the portable terminal communication apparatus 12-1 and the portable terminal communication apparatus 12-2, which access the broadcast apparatus 11 via the Internet 14, with the data broadcast content.

The broadcasting system 1 is configured in the above-mentioned manner.

It should be noted that in the following description, as it is not particularly necessary to differentiate the portable terminal communication apparatus 12-1 from the portable terminal communication apparatus 12-2, these are referred to as a portable terminal communication apparatus 12. In addition, as it is not particularly necessary to differentiate the display section 12A-1 from the display section 12A-2, these are referred to as a display section 12A.

[Screen Display of Portable Terminal Communication Apparatus]

Now, referring to FIGS. 3 to 9, a screen display state of the display section 12A of the portable terminal communication apparatus 12 will be described.

In the broadcast apparatus 11, as methods of broadcasting the broadcast streams, there are two methods including TV-linked data broadcasting and independent data broadcasting.

As shown in FIG. 3A, in the TV-linked data broadcasting, a video stream, an audio stream, a data stream, and a stream for transmission control information are multiplexed and broadcast. Further, in the case of an MPEG2-TS (Moving Picture Experts Group 2-Transport Stream), the stream for transmission control information includes packets with information described in a table in a section form, such as a PSI (Program Specific Information), being carried in the payload. The PSI is information necessary for a system that selects a certain channel and receives data from the channel. The PSI contains a section having a data structure of a PMT (Program Map Table) or the like. In the PMT, video, audio, and additional data included in a corresponding program, and a PID of a PCR are described.

In the portable terminal communication apparatus 12, this broadcast stream is received, and then the multiplexed stream is separated. Then, on the display section 12A, the video content obtained from the video stream and the data broadcast content obtained from the data stream are displayed on the same screen. It should be noted that the data broadcast content is described, for example, in a BML (Broadcast Markup Language) being a description language for data broadcasting.

On the other hand, as shown in FIG. 3B, in the independent data broadcasting, only the data stream is broadcast. In the portable terminal communication apparatus 12, this broadcast stream is received, and then only the data broadcast content obtained from the data stream is displayed.

Further, as shown in FIG. 4, as the display section 12A, there is one capable of performing either one or both of vertically long display in which the screen display is vertically long and horizontally long display in which the screen display is horizontally long. Depending on the state of the screen display, displayed information is varied.

Figure 4A:
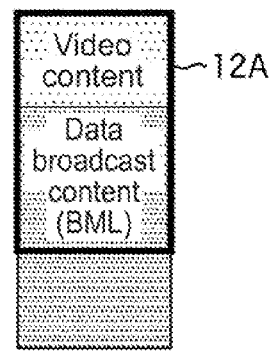
FIG. 4 are diagrams for illustrating vertically long display and horizontally long display in the data broadcasting.
Figure 4B:
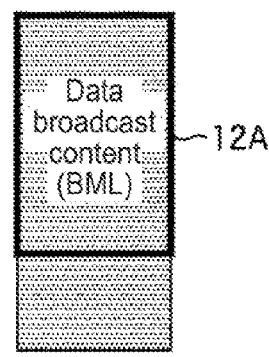

For example, in the case where the display section 12A is capable of performing the vertically long display, when the broadcast stream of the TV-linked data broadcasting is received, the video content and the data broadcast content are displayed on the display section 12A, that is, the same screen, as shown in FIG. 4A. On the other hand, when the broadcast stream of the independent data broadcasting is received, only the data broadcast content is displayed on the display section 12A as shown in FIG. 43.

Figure 4C:
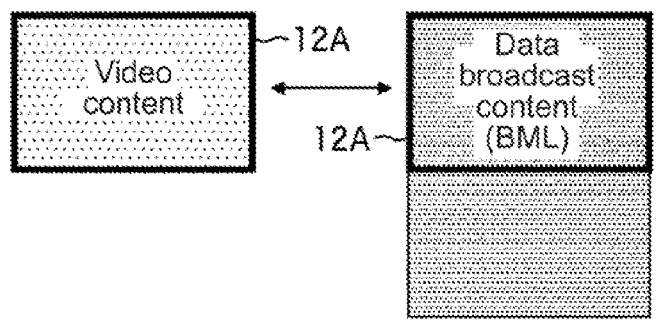
Figure 4D:
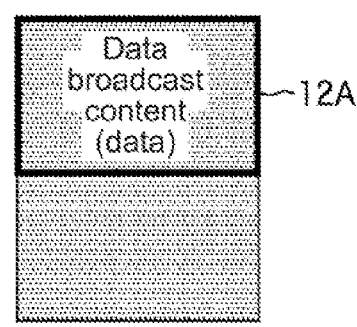

On the other hand, in the case where the display section 12A is capable of performing the horizontally long display, when the broadcast stream of the TV-linked data broadcasting is received, the video content and the data broadcast content are individually displayed by changing the screen display as shown in FIG. 4C. That is because in the case of the horizontally long display, the screen display is too small to browse the data broadcast content together with the video content on the same screen. On the other hand, when the broadcast stream of the independent data broadcasting is received, only the data broadcast content is displayed on the display section 12A as shown in FIG. 4D.

It should be noted that in the example shown in FIG. 4, in the case where it is not possible to display information of the data broadcast content on the single screen, by vertically scrolling the screen display, all the information is displayed.

Further, as shown in FIG. 5, as methods of arranging the video content and the data broadcast content, there are two methods including separate arrangement and overlay arrangement.

Figure 5B:
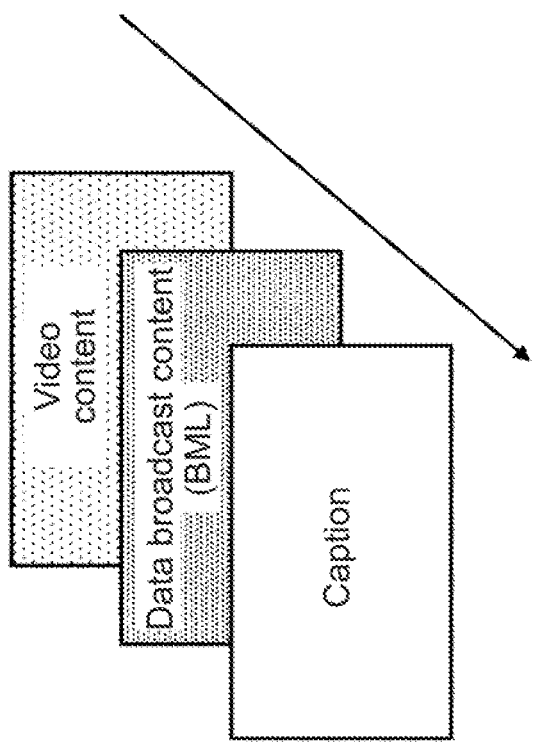
FIG. 5 are diagrams for illustrating separate arrangement and overlay arrangement.
Figure 5A:
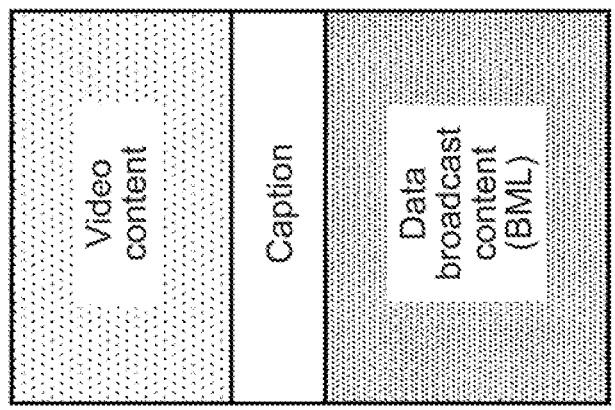
Figure 6A:
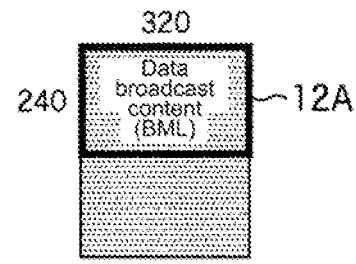
FIG. 6 are diagrams for illustrating resolutions in the data broadcasting.
Figure 6B:
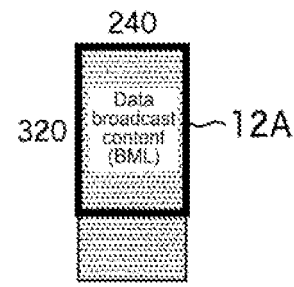
Figure 6C:
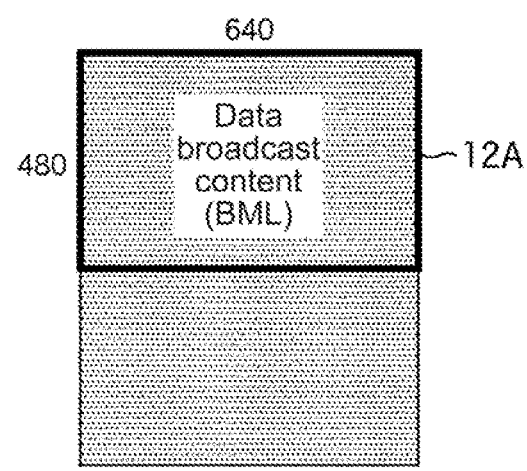
Figure 6D:
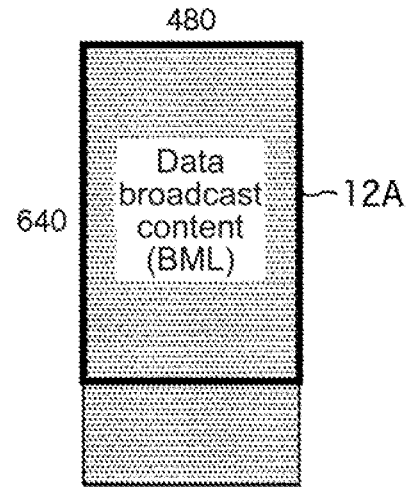

As shown in FIG. 5A, the separate arrangement means a method of separating video content, a caption, and data broadcast content from each other and separately arranging them. For example, in a reception apparatus for one-segment broadcasting, this method is used. On the other hand, as shown in FIG. 5B, the overlay arrangement means a method of arranging the video content, the data broadcast content, and the caption in an overlaid state. For example, in a reception apparatus for digital terrestrial broadcasting on a TV or the like, this method is used.

Further, as shown in FIG. 6, as resolutions of the data broadcast content, there are, for example, a QVGA (Quarter Video Graphics Array) and a VGA (Video Graphics Array).

The QVGA has, for example, a pixel aspect ratio of 4:3, and adopts horizontally long display (FIG. 6A) in 240*320 pixels in the vertical and horizontal directions and vertically long display (FIG. 6B) in 320*240 pixels in the vertical and horizontal directions. On the other hand, the VGA has, for example, a pixel aspect ratio of 4:3, and adopts horizontally long display (FIG. 6C) in 480*640 pixels in the vertical and horizontal directions and vertically long display (FIG. 6D) in 640*480 pixels in the vertical and horizontal directions. It should be noted that the resolutions shown in FIG. 6 are merely examples and other resolutions may be employed.

Regarding the TV-linked data broadcasting and the independent data broadcasting, relationships between the arrangement methods and the resolutions in the vertical and horizontal directions are summarized as shown in FIGS. 7 and 8.

As shown in FIG. 7, in the TV-linked data broadcasting, in order to perform the vertically long display and the separate arrangement, separately displaying the video content and the data broadcast content and displaying only the data broadcast content are switched. On the other hand, in the case of the vertically long display, the overlay arrangement is not performed.

Further, in the TV-linked data broadcasting, in order to perform the horizontally long display and the separate arrangement, displaying only the video content and displaying only the data broadcast content are switched. On the other hand, in order to perform the overlay arrangement, the data broadcast content is overlaid on the video content for display.

It should be noted that in the case where the display section 12A is capable of performing both of the vertically long display and the horizontally long display, when the screen display is changed from the vertically long display to the horizontally long display, this screen display is changed to displaying the video content in the separate arrangement or displaying the video content and the data broadcast content in the overlay arrangement.

In contrast, as shown in FIG. 8, in the independent data broadcasting, in order to perform the vertically long display and the separate arrangement, displaying only the data broadcast content is performed. On the other hand, in the case of the vertically long display, the overlay arrangement is not performed.

Further, in the independent data broadcasting, in order to perform the vertically long display, displaying only the data broadcast content is performed. On the other hand, in the case of the vertically long display, the overlay arrangement is not performed.

In sum, as styles that should be assumed as the states of screen display of the display section 12A of the portable terminal communication apparatus 12, there are six styles as follows.

(a) QVGA (resolution 240*480), vertically long display, separate arrangement
(b) QVGA (resolution 320*480), horizontally long display, separate arrangement
(c) QVGA (resolution 320*240), horizontally long display, overlay arrangement
(d) VGA (resolution 480*960), vertically long display, separate arrangement
(e) VGA (resolution 640*960), horizontally long display, separate arrangement
(f) VGA (resolution 640*480), horizontally long display, overlay arrangement As shown in the above, the plurality of styles are provided, and for each portable terminal communication apparatus 12, a style that can be applied to it is different. Further, some portable terminal communication apparatuses 12 correspond to two or more styles. For example, exemplifying a portable telephone, smart phones A, B, and a tablet PC as the portable terminal communication apparatuses 12, each terminal corresponds to a different style(s) as shown in FIG. 9.

For example, the portable telephone corresponds only to the style a. Further, the smart phone A can be used for both of the vertically long display and the horizontally long display. In the case of using the smart phone A for the vertically long display, it corresponds to three styles including the styles a, b, d. In addition, in the case of using the smart phone A for the horizontally long display, it corresponds to all styles of styles a to f. Like the smart phone A, it corresponds to the plurality of styles, a priority is set for each style. For example, in the case where it is used for the vertically long display, the priority is set to become higher in the order of the styles d, a, b. In the case where it is used for the horizontally long display, the priority is set to become higher in the order of the styles f, c, e, b, d, a.

Further, the smart phone B is set to be used for both of the vertically long display and the horizontally long display. In the case where the smart phone B is used for the vertically long display, the smart phone B corresponds to the styles a, d, and the priority is set to become higher in the order of the styles a, d. In the case where the smart phone B is used for the horizontally long display, the smart phone B corresponds to the styles e, b, and the priority is set to become higher in the order of the styles e, b. In addition, the tablet PC corresponds to the styles e, d, b, a, and the priority is set to become higher in the order of the styles e, d, b, a.

As mentioned above, the screen display state of the display section 12A is different for each of the portable terminal communication apparatuses 12. Therefore, it is necessary to select a display style in accordance with the screen display state, to thereby perform optimal screen display. In view of this, hereinafter, processing of selecting a display style depending on the screen display of the display section 12A will be described.

[Style Selection Processing]

By the way, for providing content, a service provider needs to consider, for example, the contents of a demanded service, a user being a target for the service, a screen display state of the display section 12A of the portable terminal communication apparatus 12 possessed by the user, and costs for producing content. For each content to be provided after the consideration, the service provider provides, for example, the six styles including the styles a to f described above, so that the portable terminal communication apparatus 12 is allowed to perform screen display having any one style of the styles a to f.

That is, the portable terminal communication apparatus 12 selects, as the screen display state of the display section 12A, a corresponding style out of the styles a to f according to the priority depending on, for example, a screen display direction such as the vertically long display and the horizontally long display, and a user's screen display setting.

Therefore, in the case of sending content corresponding to a plurality of styles, the broadcast apparatus 11 needs to inform which style content being a target corresponds to and to provide the portable terminal communication apparatus 12 with information for accessing content having a selected style. Further, by setting a plurality of style sheets within the same content, the portable terminal communication apparatus 12 may be allowed to select a style.

That is, as a style selection method, there are two stages including a stage in which a display style is selected in units of content (hereinafter, referred to as first-stage style selection) and a stage in which a display style is selected within the same content (hereinafter, referred to as second-stage style selection).

In this regard, referring to FIGS. 10 and 11, first-stage style selection processing and second-stage style selection processing, which are performed by the portable terminal communication apparatus 12, will be described.

Figure 10:
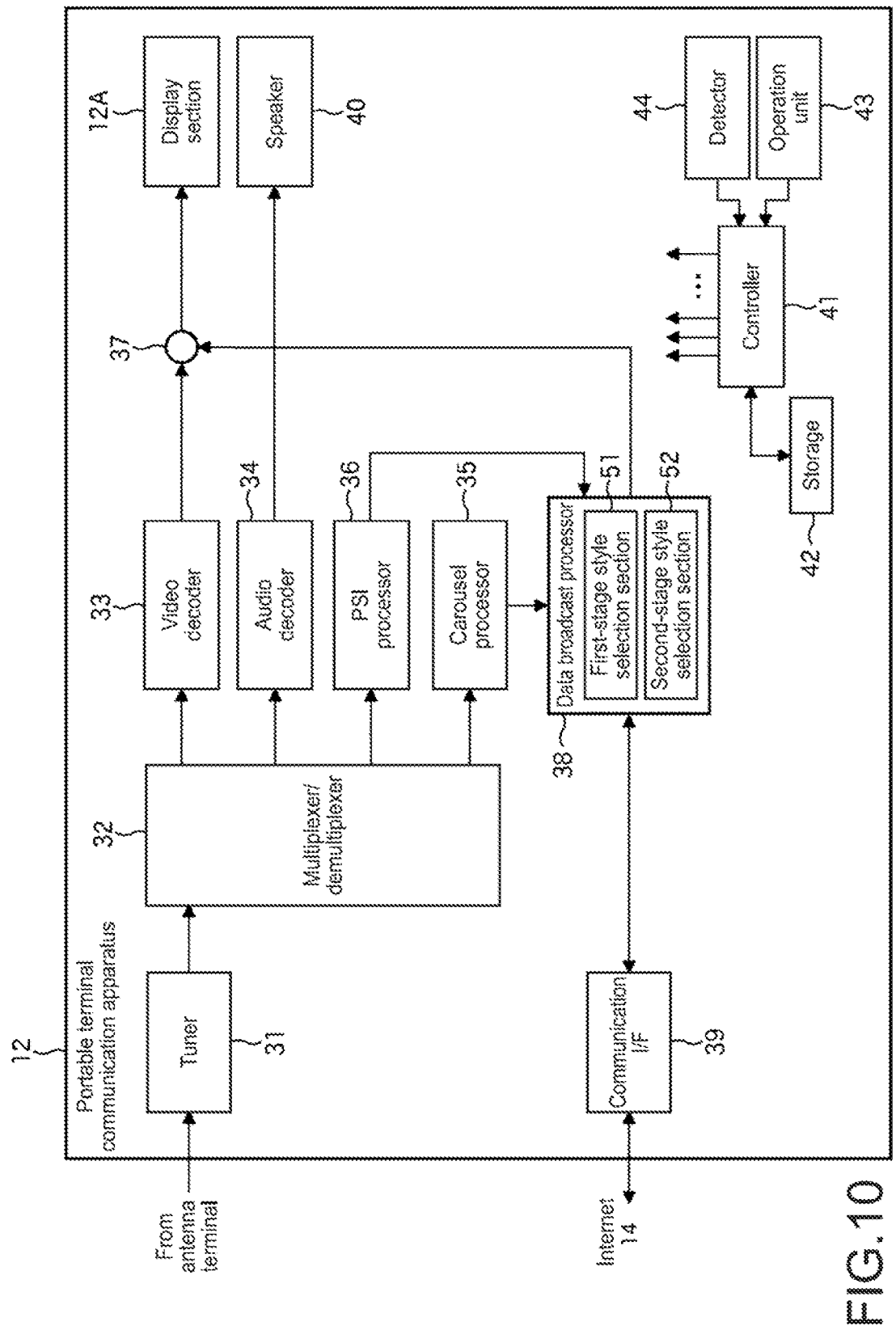
FIG. 10 is a diagram showing a configuration example of a portable terminal apparatus.

FIG. 10 is a diagram showing a configuration example of the portable terminal communication apparatus.

The portable terminal communication apparatus 12 is constituted of, in addition to the above-mentioned display section 12A, a tuner 31, a multiplexer/demultiplexer 32, a video decoder 33, an audio decoder 34, a carousel processor 35, a PSI processor 36, a synthesizer 37, a data broadcast processor 38, a communication I/F 39, a speaker 40, a controller 41, a storage 42, an operation unit 43, and a detector 44.

The tuner 31 receives and demodulates a digital television broadcast signal corresponding to a channel selected by the user, and provides the resulting broadcast stream to the multiplexer/demultiplexer 32.

The multiplexer/demultiplexer 32 separates the broadcast stream provided from the tuner 31 into a video stream, an audio stream, a data stream, and a stream for transmission control information, and provides them to the video decoder 33, the audio decoder 34, the carousel processor 35, and the PSI processor 36, respectively.

The video decoder 33 decodes the video stream provided from the multiplexer/demultiplexer 32, and provides the resulting video signal of video content to the synthesizer 37.

The audio decoder 34 decodes the audio stream provided from the multiplexer/demultiplexer 32, and provides the resulting audio signal to the speaker 40 for output.

The carousel processor 35 extracts data of data broadcast content from the data stream provided from the multiplexer/demultiplexer 32, and provides it to the data broadcast processor 38.

It should be noted that the data of the data broadcast content contains, in addition to a BML document file created in the BML, information on the style sheet and the like. Further, the data of the data broadcast content is transmitted for each of objects constituting content data, which is referred to as a module, using a so-called data carousel transmission method.

The PSI processor 36 extracts a PSI from the stream for transmission control information that is provided from the multiplexer/demultiplexer 32, and performs processing on the extracted PSI. The PSI processor 36 acquires a list of styles defined in the PMT included in the PSI depending on needs, and provides it to the data broadcast processor 38.

The data broadcast processor 38 is provided with, in addition to the data of the data broadcast content from the carousel processor 35, the list of styles from the PSI processor 36 depending on needs.

The data broadcast processor 38 performs processing on the data of the data broadcast content. Further, the data broadcast processor 38 selects, based on the data of the data broadcast content or the list of styles, a display style for the data broadcast content. The data broadcast processor 38 provides the data of the data broadcast content corresponding to the selected style to the synthesizer 37.

The data broadcast processor 38 is constituted of a first-stage style selection section 51 and a second-stage style selection section 52.

For example, when the user selects a channel, the first-stage style selection section 51 performs the first-stage style selection processing, to thereby select a display style for each of the data broadcast content. In the first-stage style selection processing, any one method of a script method, a metafile method, and a signaling method to be described later is used.

For example, when the data broadcast content selected during the selection of the channel correspond to a plurality of style sheets or in the case where the screen display state of the display section 12A is changed, the second-stage style selection section 52 performs the second-stage style selection processing, to thereby select a display style for the data broadcast content. In the second-stage style selection processing, any one method of a link method, an import method, and a medium method to be described later is used.

The communication I/F 39 connects via the Internet 14 to the server 13 under control by the data broadcast processor 38. The communication I/F 39 provides the data of the data broadcast content, which is received from the server 13, to the data broadcast processor 38.

The synthesizer 37 is provided with the video signal of the video content from the video decoder 33 and the data of the data broadcast content from the data broadcast processor 38. The synthesizer 37 synthesizes the video signal of the video content and the data of the data broadcast content, and provides them to the display section 12A for display.

The controller 41 controls operations of the sections of the portable terminal communication apparatus 12.

The storage 42 stores various types of information including information on the screen display setting and the like under control by the controller 41. The controller 41 reads out the information on the screen display setting that is stored in the storage 42, and provides it to the data broadcast processor 38.

The operation unit 43 receives various operations from the user, and provides the corresponding operation signals to the controller 41. The controller 41 controls operations of the sections in accordance with the operation signals from the operation unit 43.

The detector 44 is constituted of, for example, a gyro sensor, and detects motion of the portable terminal communication apparatus 12 and provides a result of the detection to the controller 41. Based on the result of the detection from the detector 44, the controller 41 determines the screen display direction of the display section 12A, for example, the vertically long display or the horizontally long display, and provides a result of the determination to the data broadcast processor 38.

The portable terminal communication apparatus 12 shown in FIG. 10 is configured in the above-mentioned manner.

Next, referring to a flowchart shown in FIG. 11, style selection processing, which is performed by the portable terminal communication apparatus 12, will be described.

In Step S11, based on the operation signal from the operation unit 43, the controller 41 determines whether or not a target channel has been selected by the user. In the case where it is determined that the target channel has been selected, the processing proceeds to Step S12.

In Step S12, the first-stage style selection section 51 performs the first-stage style selection processing, to thereby select a display style for each of the data broadcast content.

It should be noted that the details of the first-stage style selection processing will be described later with reference to FIGS. 12 to 24.

In Step S13, the first-stage style selection section 51 determines whether or not the data broadcast content corresponding to the style selected in the first-stage style selection processing corresponds to a plurality of style sheets.

In Step S13, it is determined that the data broadcast content corresponds to the plurality of style sheets, the processing proceeds to Step S14. For example, to a BML document file of the data broadcast content in the separate arrangement, one or more style sheets correspond.

In Step S14, the second-stage style selection section 52 performs the second-stage style selection processing, to thereby select one style sheet from the plurality of style sheets to which the data broadcast content corresponds. The second-stage style selection section 52 provides a BML document file to be a screen layout corresponding to the style sheet selected by the second-stage style selection processing, to the synthesizer 37, to thereby display it on the display section 12A together with the video content.

It should be noted that the details of the second-stage style selection processing will be described later with reference to FIGS. 25 to 33.

On the other hand, in Step S13, in the case where it is determined that the data broadcast content does not correspond to the plurality of style sheets, the processing proceeds to Step S15. Further, although there may also be a BML document file not corresponding to the style sheet, also in this case, the processing proceeds to Step S15. For example, to the BML document file of the data broadcast content in the overlay arrangement, a single style sheet corresponds.

In Step S15, the first-stage style selection section 51 provides the BML document file acquired by the first-stage style selection processing, to the synthesizer 37, to thereby display it on the display section 12A together with the video content.

In Step S16, based on the result of the detection from the detector 44 and the information on the setting that is stored in the storage 42, the controller 41 determines whether or not the screen display state such as the screen display direction or the screen display setting of the display section 12A has been changed. In Step S13, in the case where it is determined that the screen display direction or the screen display setting has been changed, the processing proceeds to Step S17.

In Step S17, the second-stage style selection section 52 performs the second-stage style selection processing, to thereby select one style sheet from the plurality of style sheets to which the data broadcast content being displayed on the display section 12A corresponds.

It should be noted that the second-stage style selection processing performed in Step S17 is the same as the second-stage style selection processing performed in Step S14, and the details thereof will be described later with reference to FIGS. 25 to 33.

On the other hand, in Step S16, in the case where it is determined that the screen display direction or the screen display setting has been not changed, Step S17 is skipped, and the processing proceeds to Step S18.

In Step S18, based on the operation signal from the operation unit 43, the controller 41 determines whether or not to terminate viewing of the content.

In Step S18, in the case where it is determined not to terminate the viewing, the processing returns to Step S16, and the above-mentioned processing is repeated. Accordingly, in the case where the screen display direction or the like of the display section 12A is changed before the viewing of the content is terminated, the second-stage style selection processing is performed.

Figure 11:
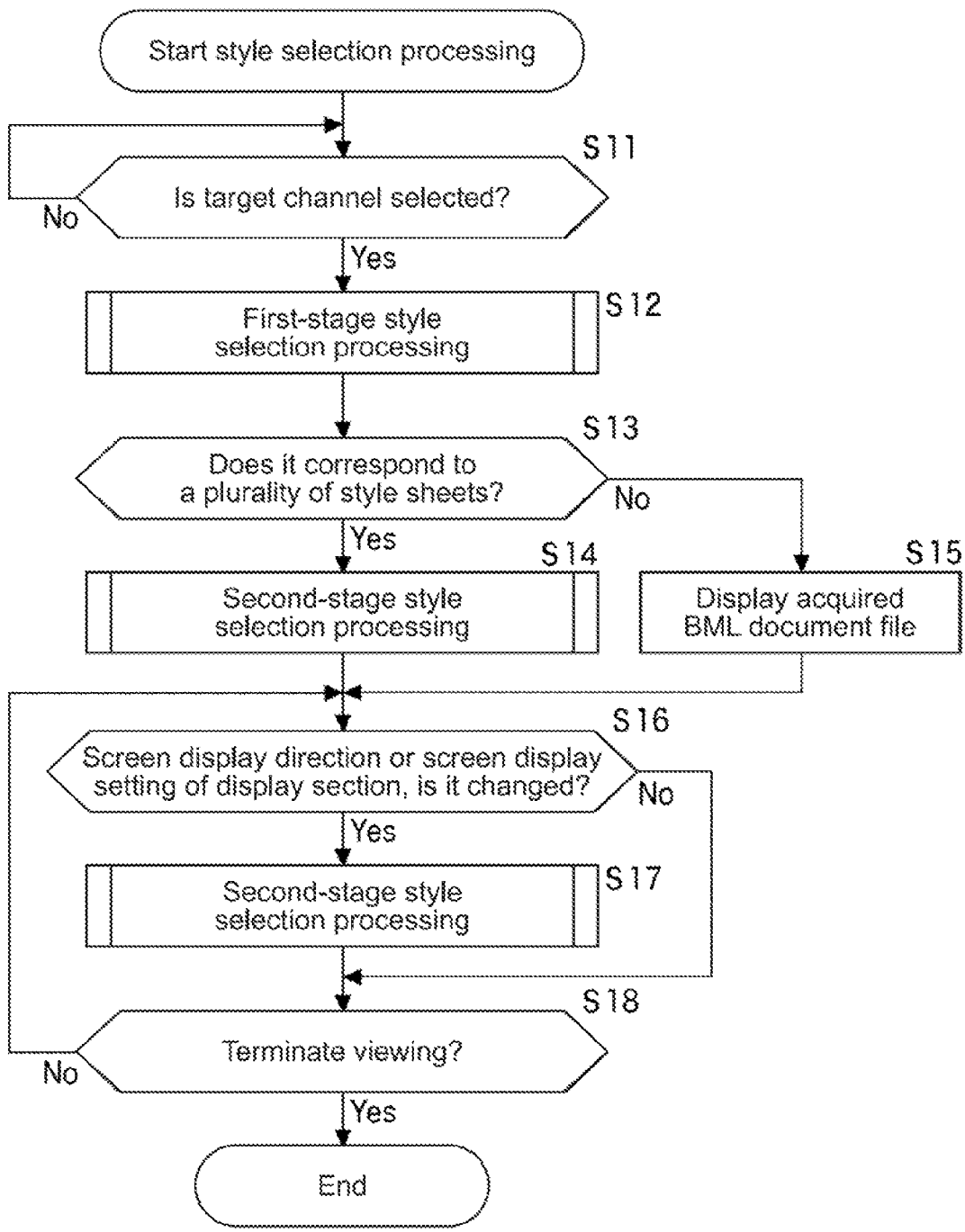
FIG. 11 is a flowchart for illustrating style selection processing.

On the other hand, in Step S18, in the case where it is determined to terminate the viewing, the style selection processing in FIG. 11 is terminated.

As mentioned above, in the style selection processing, during the selection of the channel, the first-stage style selection processing and the second-stage style selection processing are performed, and in the case where the screen display direction or the like of the display section 12A is changed, the second-stage style selection processing is performed. In this manner, the selection processing in two stages is performed.

[First-Stage Style Selection Processing]

Next, referring to FIGS. 12 to 24, the details of the first-stage style selection processing will be described.

As mentioned above, as the first-stage style selection method, any one method of the script method, the metafile method, and the signaling method can be used. In this regard, hereinafter, these three methods will be described.

[Script Method]

First, referring to FIGS. 12 to 16, a case where the script method is employed as the first-stage style selection method will be described.

Figure 12:
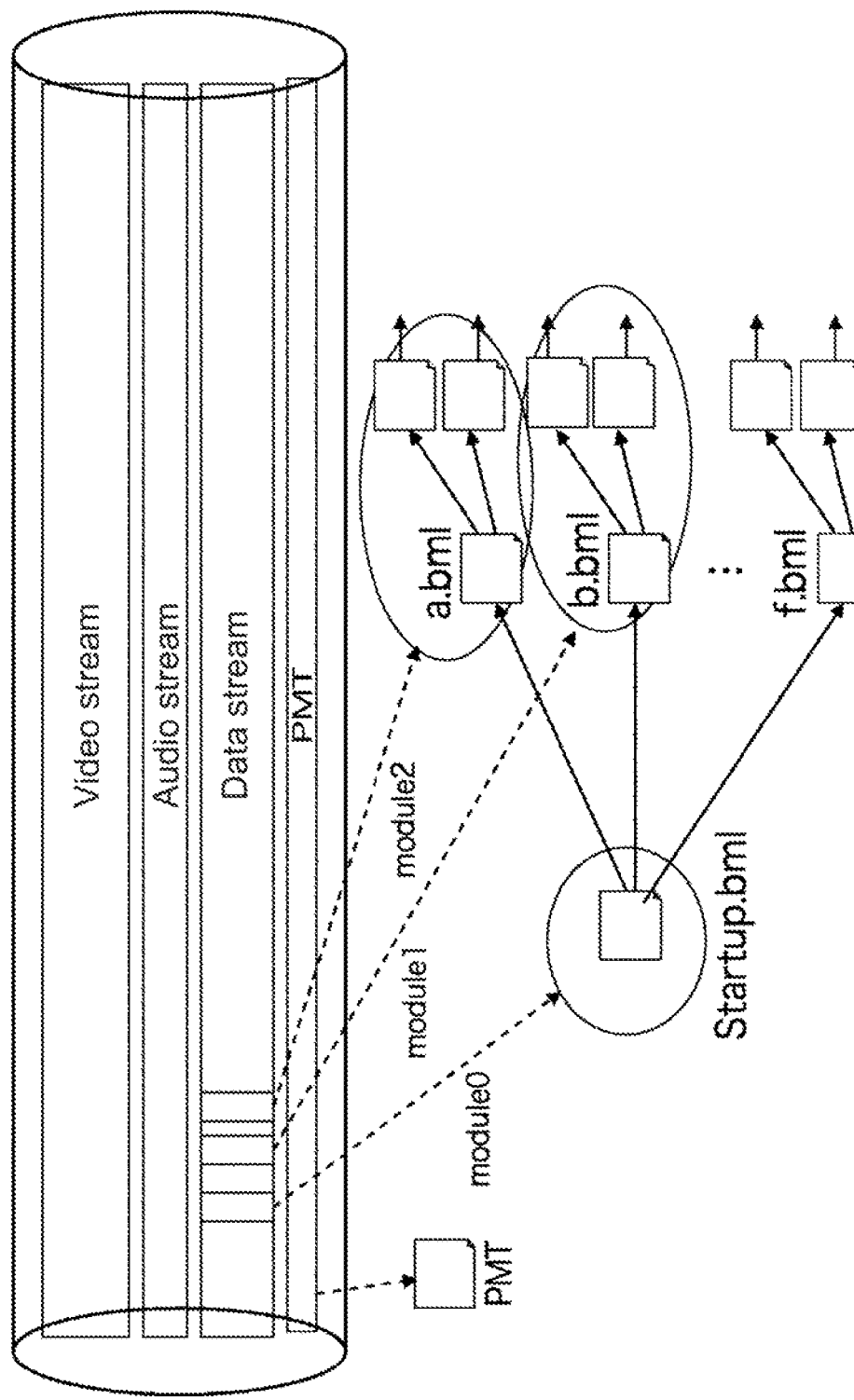
FIG. 12 is a diagram showing a configuration of a broadcast stream in a script method.

FIG. 12 is a diagram showing a configuration of a broadcast stream in the script method.

In the broadcast stream, a video stream, an audio stream, a data stream, and a stream for transmission control information are multiplexed and broadcast.

The data stream contains module0, module1, module2, . . . , and each module contains a BML document file, a style sheet file, and the like. Module0 contains, as a BML document entry file, Startup.bml. Startup.bml is a file having no display element. In Startup.bml, a script for selecting a style provided by the service is described, and by executing the script, an optimal style is selected.

FIG. 13 is a diagram showing an example of a style selection function.

The style selection function is a function for selecting, from the content having a plurality of styles to be provided, a style to be used by the portable terminal communication apparatus 12.

SelectStyleOfContent( ) designates, as an argument style_availability, a bitmap indicating availability to provide each style, to thereby return the number of selected style as a return value. Style_availability is constituted of six bits. A first bit is assigned availability to use the style a, and the next bit is assigned availability to use the style b. Similarly, availabilities for the styles c to f are assigned to a third bit and the subsequent bits.

In the portable terminal communication apparatus 12, out of the styles to be provided, a usable style is selected depending on, for example, the screen display direction such as the vertically long display or the horizontally long display or the screen display setting such as availability of the overlay arrangement or a character size. Then, as the return value, the style number (bit number in FIG. 13) corresponding to an arrangement order of style_availability is returned. It should be noted that in the case where no usable style is present, null is returned as the return value.

Referring back to FIG. 12, for example, in the case where by executing the style selection function, the style a is selected as an optimal style, a transition from Startup.bml to a.bml described in module2 is made. Then, a transition to other BML document files described in module2 having the same style as that of a.bml is made. Similarly, in the case where the style b is selected as the optimal style, a transition from Startup.bml to b.bml described in module1 is made.

Further, in the case where the style f is selected as the optimal style, f.bml is acquired from the server 13 via the Internet 14, and a transition from Startup.bml to f.bml is made.

It should be noted that in the example shown in FIG. 12, the BML document file corresponds to the data broadcast content.

Figure 14:
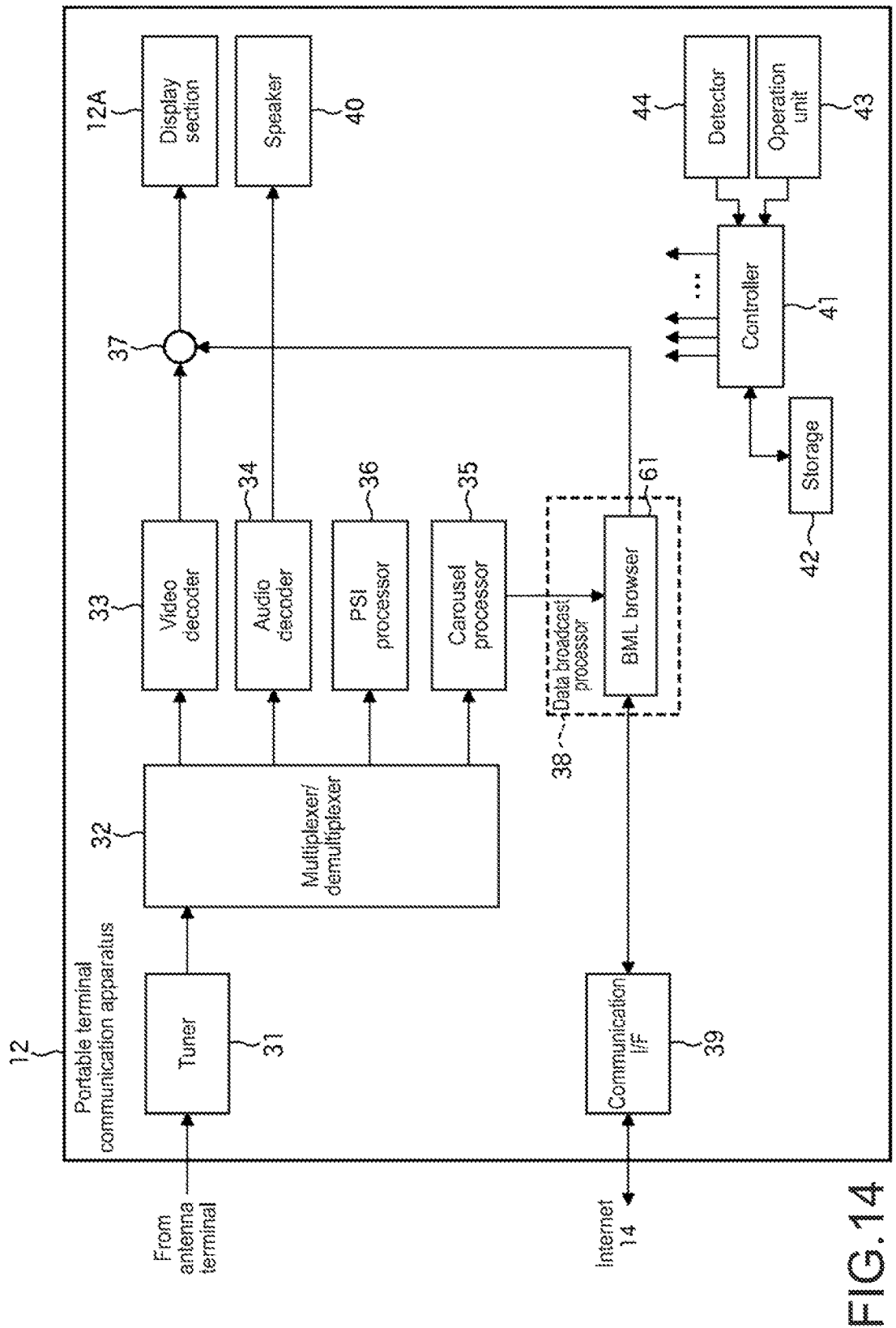
FIG. 14 is a diagram showing a configuration example of a portable terminal apparatus in the case where the script method is employed.

FIG. 14 is a diagram showing a configuration example of a portable terminal communication apparatus in the case where the script method is employed.

In the portable terminal communication apparatus 12 shown in FIG. 14, the same blocks as those of the portable terminal communication apparatus 12 shown in FIG. 10 are denoted by the same reference symbols. In the portable terminal communication apparatus 12 in the script method, as the data broadcast processor 38, a BML browser 61 is provided.

The BML browser 61 provides data of a BML document file provided from the carousel processor 35, to the synthesizer 37 to be displayed on the display section 12A.

When the user selects a channel, the BML browser 61 executes the style selection function and performs the first-stage style selection processing. Further, when the screen display state of the display section 12A is changed, the BML browser 61 performs the second-stage style selection processing, using the link method, the import method, or the medium method to be described later.

It should be noted that the portable terminal communication apparatus 12 shown in FIG. 14 basically has the same configuration as that of the portable terminal communication apparatus 12 shown in FIG. 10 except for the data broadcast processor 38, and thus description thereof will be omitted.

The portable terminal communication apparatus 12 shown in FIG. 14 is configured in the above-mentioned manner.

Next, referring to a flowchart shown in FIG. 15, the first-stage style selection processing in the case where the script method, which is performed by the portable terminal communication apparatus 12 shown in FIG. 14 is employed, will be described. This processing corresponds to Step S12 in FIG. 11.

It should be noted that in order to perform the first-stage style selection processing, the tuner 31 receives and demodulates a digital television broadcast signal, and the multiplexer/demultiplexer 32 separates a broadcast stream into a video stream, an audio stream, a data stream, and a stream for transmission control information.

In Step S31, the carousel processor 35 determines whether or not the data broadcast processor 38 corresponds to the style selection function. In the case where it is determined that the data broadcast processor 38 corresponds to the style selection function, the processing proceeds to Step S32.

In Step S32, the carousel processor 35 acquires a BML document entry file from the data stream, and provides it to the BML browser 61.

In Step S33, the BML browser 61 executes the BML document entry file acquired from the carousel processor 35.

In Step S34, the BML browser 61 performs style selection processing using the style selection function (selectStyleOfContent( ) in FIG. 13), which is performed by executing the BML document entry file.

Figure 16:
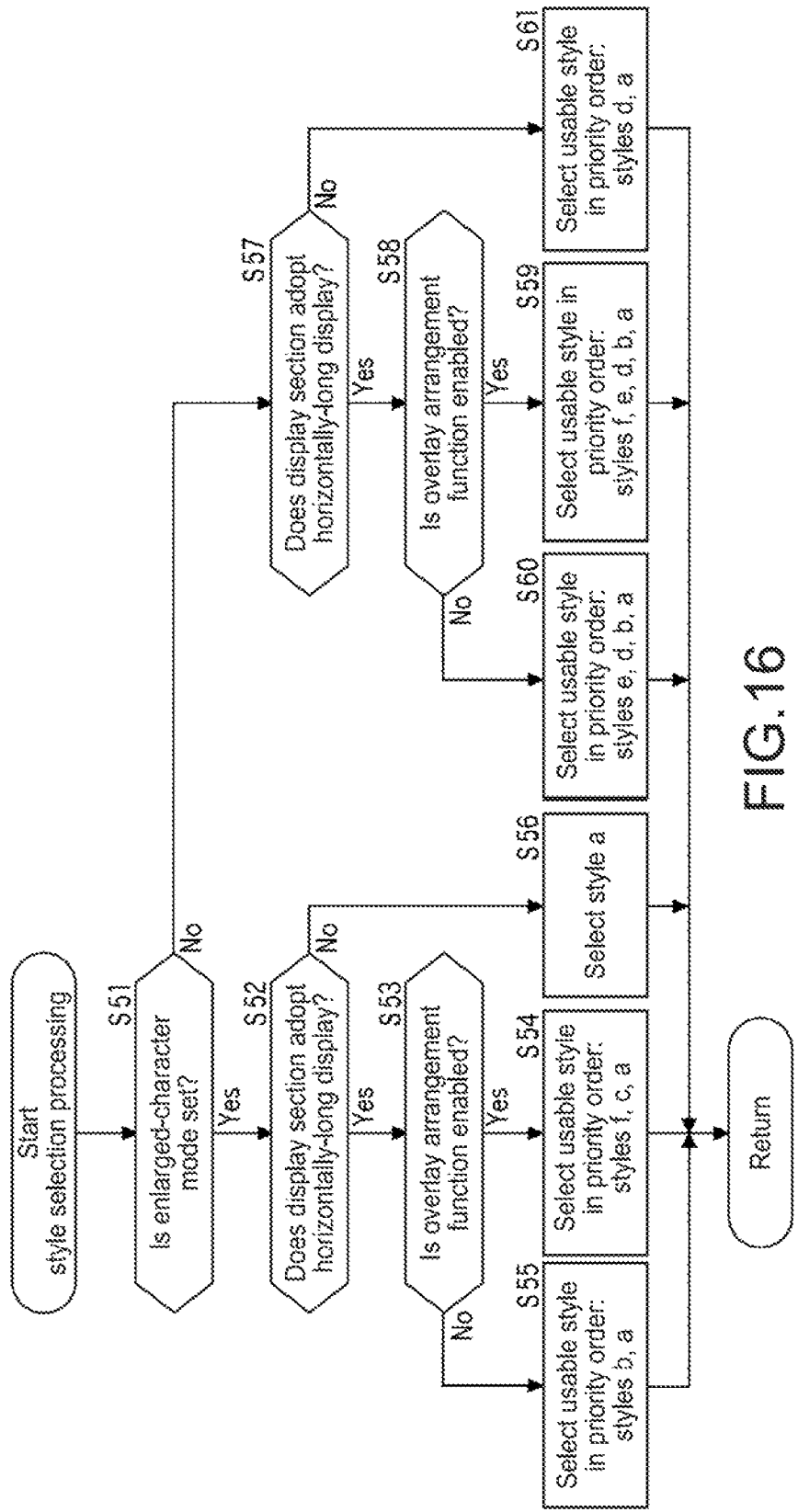
FIG. 16 is a flowchart for illustrating processing of the style selection function.

Now, referring to a flowchart shown in FIG. 16, style selection function processing using the style selection function, which corresponds to Step S34, will be described. It should be noted that FIG. 16 shows a case where the portable terminal communication apparatus 12 is the smart phone A.

In Step S51, the BML browser 61 determines whether or not an enlarged character mode has been set. In Step S51, in the case where it is determined that the enlarged character mode has been set, the processing proceeds to Step S52.

In Step S52, the BML browser 61 determines whether or not the display section 12A adopts the horizontally long display. In Step S52, in the case where it is determined that the display section 12A adopts the horizontally long display, the processing proceeds to Step S53.

In Step S53, the BML browser 61 determines whether or not an overlay arrangement function is enabled.

In Step S53, in the case where it is determined that the overlay arrangement function is enabled, the processing proceeds to Step S54. In Step S54, the BML browser 61 selects a usable style in a priority order: the styles f, c, a.

Further, in Step S53, in the case where it is determined that the overlay arrangement function is not enabled, the processing proceeds to Step S55. In Step S55, the BML browser 61 selects a usable style in a priority order: the styles b, a.

In addition, in Step S52, in the case where it is determined that the display section 12A does not adopt the horizontally long display, i.e., adopts the vertically long display, the processing proceeds to Step S56. In Step S56, the BML browser 61 selects the style a.

On the other hand, in Step S51, in the case where it is determined that the enlarged character mode has not been set, the processing proceeds to Step S57.

In Step S57, the BML browser 61 determines whether or not the display section 12A adopts the horizontally long display. In Step S57, in the case where it is determined that the display section 12A adopts the horizontally long display, the processing proceeds to Step S58.

In Step S58, the BML browser 61 determines whether or not the overlay arrangement function is enabled.

In Step S58, in the case where it is determined that the overlay arrangement function is enabled, the processing proceeds to Step S59. In Step S59, the BML browser 61 selects a usable style in a priority order: the styles f, e, d, b, a.

Further, in Step S58, in the case where it is determined that the overlay arrangement function is not enabled, the processing proceeds to Step S60. In Step S60, the BML browser 61 selects a usable style in a priority order: the styles e, d, b, a.

In addition, in Step S57, in the case where it is determined that the display section 12A does not adopt the horizontally long display, i.e., adopts the vertically long display, the processing proceeds to Step S61. In Step S61, the BML browser 61 selects a usable style in a priority order: d, a.

In this manner, out of the styles a to f to be provided for each content, one style is selected in accordance with the screen display state such as the screen display direction or the screen display setting of the display section 12A. Further, in the case where a plurality of corresponding styles are present, according to a priority set in advance, one style is selected.

Figure 15:
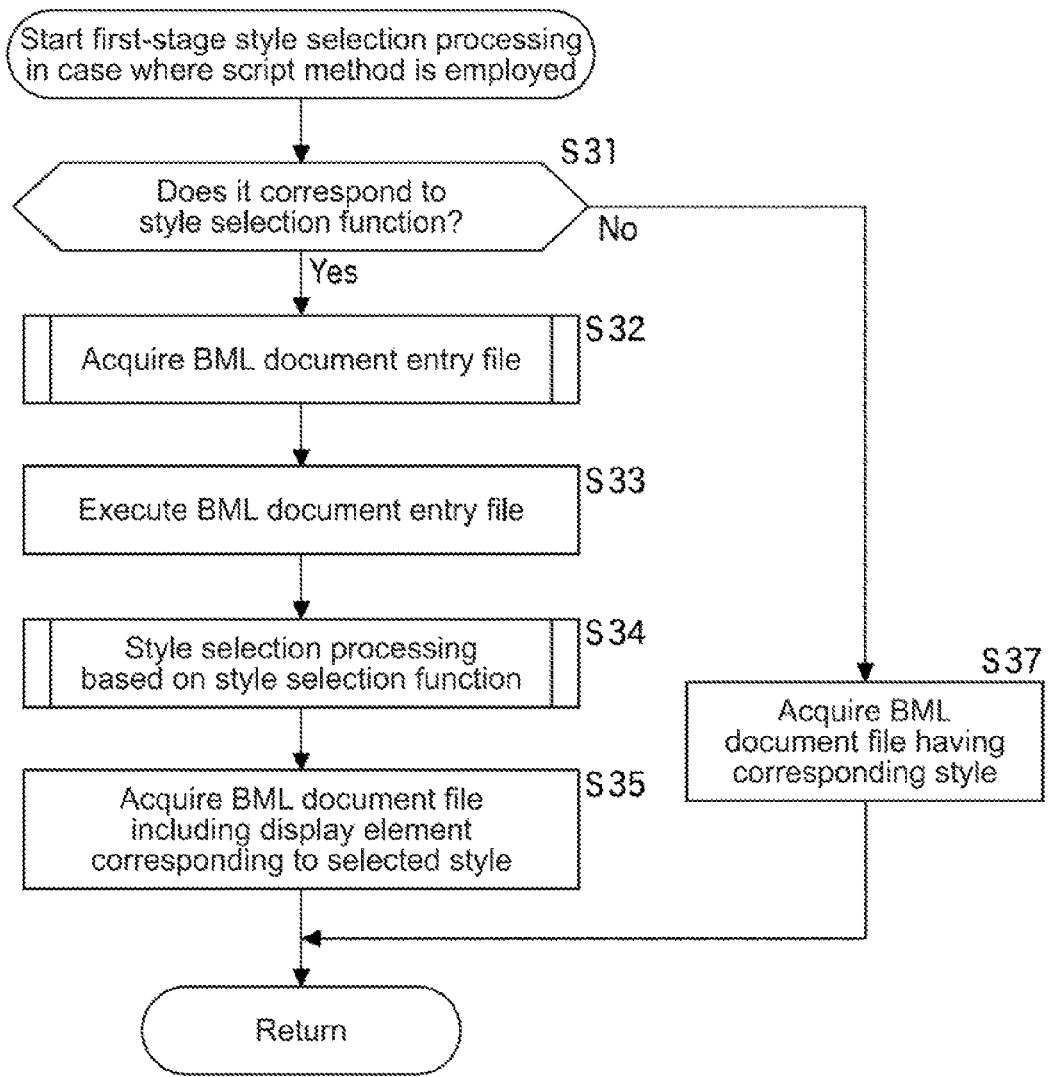
FIG. 15 is a flowchart for illustrating first-stage style selection processing in the case where the script method is employed.

When the processing in either Steps S54 to S56 or Steps S59 to S61 is complete, the processing returns to Step S34 in FIG. 15, and the processing in Step S35 and the subsequent processing are performed.

In Step S35, the BML browser 61 acquires, from the carousel processor 35, a BML document file containing a display element corresponding to the style selected by the style selection function processing using the style selection function. It should be noted that to this BML document file, one or more style sheets correspond.

On the other hand, in Step S31, in the case where it is determined that the data broadcast processor 38 does not correspond to the style selection function, the processing proceeds to Step S37. In Step S37, the BML browser 61 acquires, from the carousel processor 35, a BML document file having a corresponding style (e.g., the style a). Accordingly, for example, without having problems even with an existing portable communication terminal apparatus that does not correspond to the style selection function, the viewing of the content becomes possible.

When the processing in Step S35 or S37 is complete, the processing returns to Step S12 in FIG. 11, and the processing in Step S13 and the subsequent processing are performed.

As mentioned above, in the case where the script method is employed, by executing the style selection function (selectStyleOfContent( )) described in the BML document entry file having no display element, the selection of the style for the data broadcast content to be provided is performed. Then, a BML document file in a first page of the data broadcast content having the selected style is acquired.

[Metafile Method]

Next, referring to FIGS. 17 to 20, a case where as the first-stage style selection method, the metafile method is employed will be described.

FIG. 17 is a diagram showing a configuration of a broadcast stream in the metafile method.

In the broadcast stream, a video stream, an audio stream, a data stream, and a stream for transmission control information are multiplexed.

The data stream contains module0, module1, module2, . . . , and in module0, a metafile (Style_list.xml) is described. In Style_list.xml, a list of styles for the data broadcast content to be provided is described.

FIG. 18 is a diagram showing an example of a format of the metafile.

As shown in FIG. 18, to a Style_list element, a provided_style element belongs. The provided_style element appears and is described depending on the number of styles to be provided.

For the provided_style element, as its attributes, a horizontal_size attribute, a vertical_size attribute, a layout_policy attribute, and a link attribute are set.

The horizontal_size attribute is an attribute for designating a size of the data broadcast content in a horizontal direction, and the vertical_size attribute is an attribute for designating a size of the data broadcast content in a vertical direction. Therefore, using the horizontal_size and vertical_size attributes, a screen size (resolution) of the data broadcast content is set.

The layout_policy attribute is an attribute for designating an arrangement method for the video content and the data broadcast content. For the layout_policy attribute, as its attribute value, "separated" is set in the case of the separate arrangement, and "overlaid" is set in the case of the overlay arrangement.

The link attribute is an attribute for designating an URL (Uniform Resource Locator) of a first page of the data broadcast content.

For example, as shown in a description example shown in FIG. 18, in the case where the styles a, e, f are provided, in the Style_list element, three provided_style elements are described. In the first provided_style element, an attribute value of the style a is described, and as a link destination of the first page, "startup.bml" is designated. Similarly, in the second and third provided_style elements, attribute values of the style e, f are described.

Referring back to FIG. 17, for example, in the case where the metafile included in module0 is read and the style a is selected out of the three styles described in this metafile, a transition to "startup.bml" described in the link attribute of the first provided_style element is made. Similarly, in the case where the style e is selected, a transition to " . . . /1/startup.bml" described in the link attribute of the second provided_style element is made.

Further, in the case where the style f is selected, "http://providerA.com/databroadcast/startup.bml" described in the link attribute of the third provided_style element is accessed via the Internet 14, and a transition to startup.bml is made.

It should be noted that in the example shown in FIG. 17, the metafile and the BML document file correspond to the data broadcast content.

Figure 19:
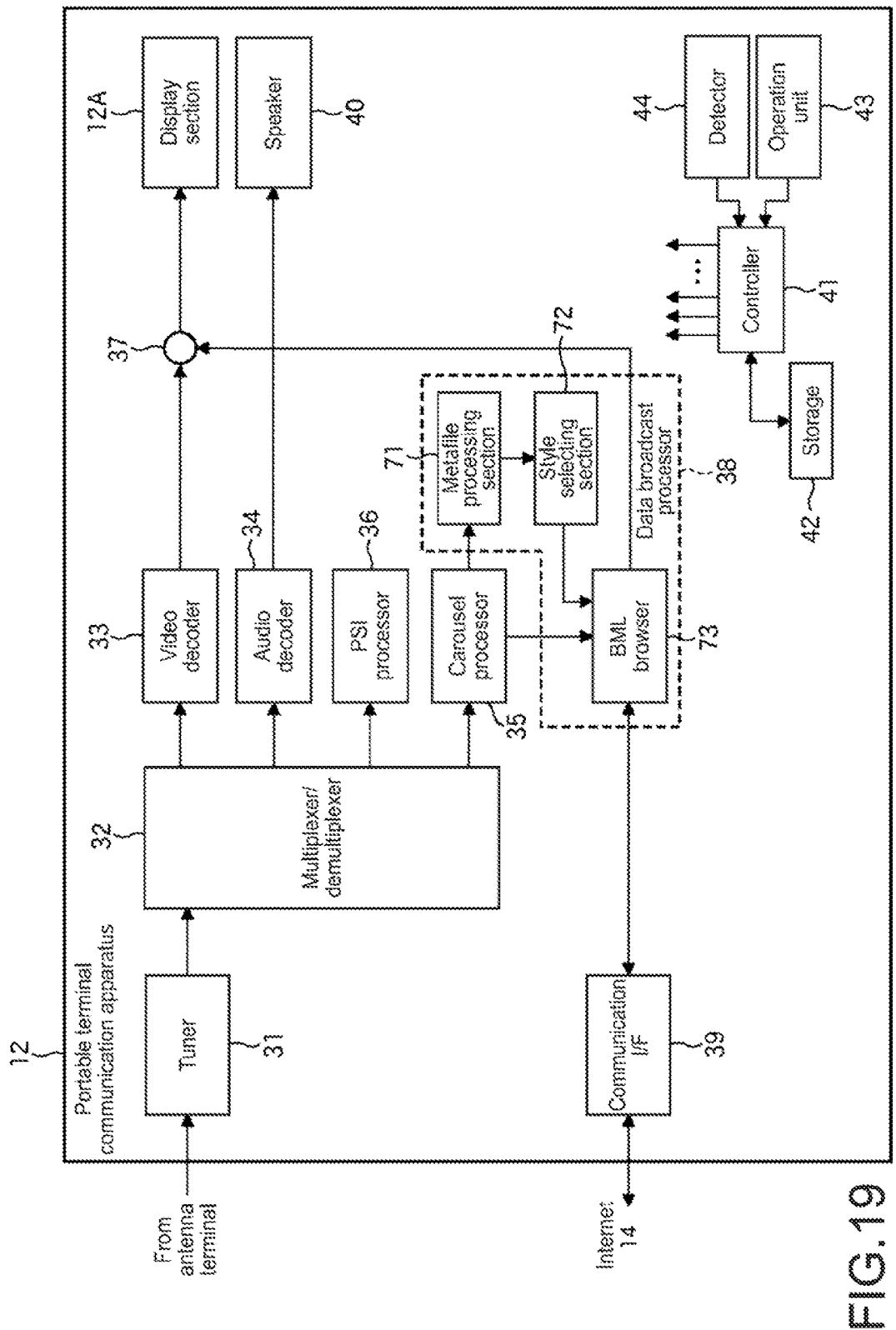
FIG. 19 is a diagram showing a configuration example of a portable terminal apparatus in the case where the metafile method is employed.

FIG. 19 is a diagram showing a configuration example of a portable terminal communication apparatus in the case where the metafile method is employed.

In the portable terminal communication apparatus 12 shown in FIG. 19, the same blocks as those of the portable terminal communication apparatus 12 shown in FIG. 10 are denoted by the same reference symbols. In the portable terminal communication apparatus 12 in the metafile method, as the data broadcast processor 38, a metafile processing section 71, a style selecting section 72, and a BML browser 73 are provided.

The metafile processing section 71 analyzes a metafile provided from the carousel processor 35, and provides a result of the analysis to the style selecting section 72.

The style selecting section 72 performs the first-stage style selection processing in accordance with the result of the analysis of the metafile provided from the metafile processing section 71, and provides a result of the selection to the BML browser 73.

Based on the result of the selection provided from the style selecting section 72, the BML browser 73 acquires a BML document file from the carousel processor 35. The BML browser 73 provides data of the acquired BML document file to the synthesizer 37 to be displayed on the display section 12A.

Further, in the case where the screen display state of the display section 12A is changed, the BML browser 73 performs the second-stage style selection processing, using the link method, the import method, or the medium method to be described later.

It should be noted that the portable terminal communication apparatus 12 shown in FIG. 19 basically has the same configuration as that of the portable terminal communication apparatus 12 shown in FIG. 10 except for the data broadcast processor 38, and thus description thereof will be omitted.

The portable terminal communication apparatus 12 shown in FIG. 19 is configured in the above-mentioned manner.

Figure 20:
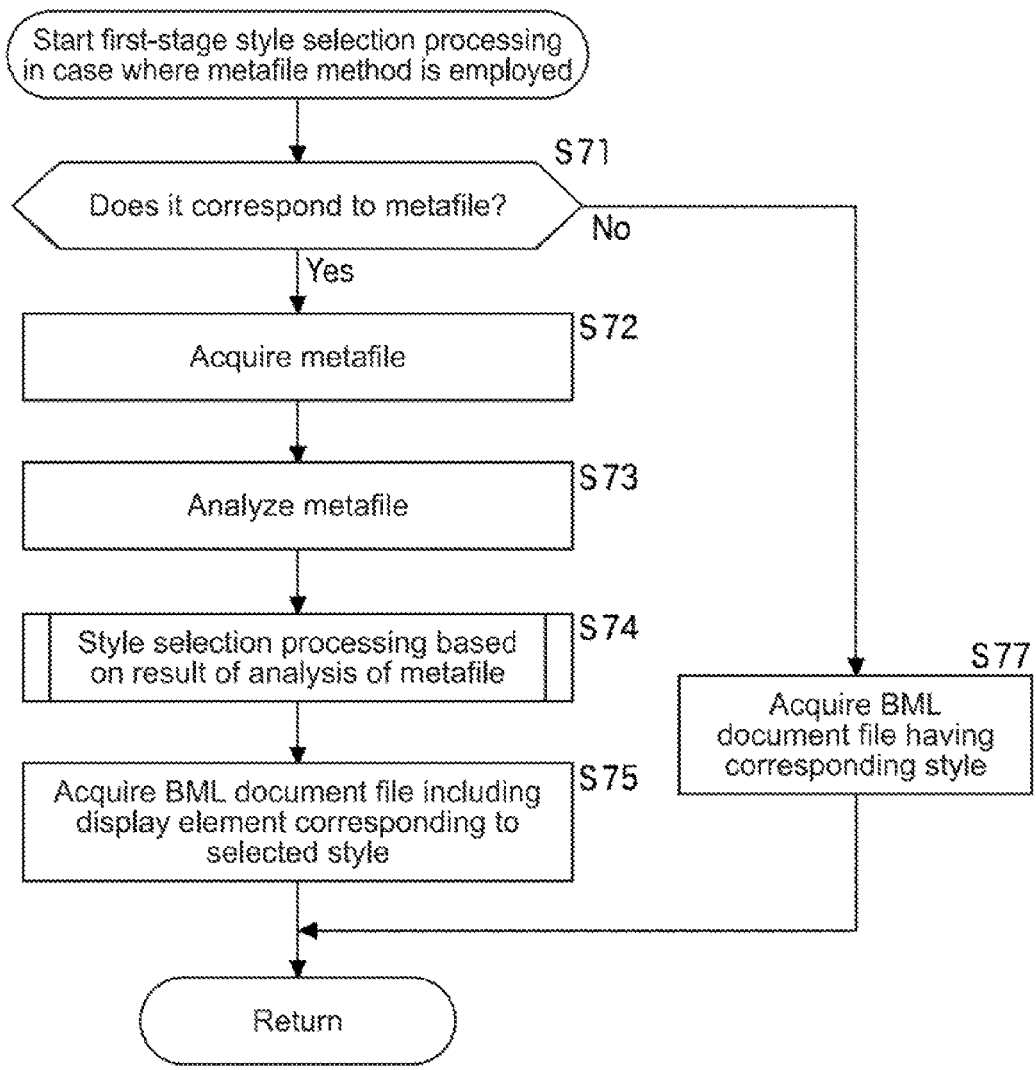
FIG. 20 is a flowchart for illustrating first-stage style selection processing in the case where the metafile method is employed.

Next, referring to a flowchart shown in FIG. 20, the first-stage style selection processing in the case where the metafile method, which is performed by the portable terminal communication apparatus 12 shown in FIG. 19, is employed will be described. This processing corresponds to Step S12 in FIG. 11.

In Step S71, the carousel processor 35 determines whether or not the data broadcast processor 38 corresponds to the metafile. In the case where it is determined that the data broadcast processor 38 corresponds to the metafile, the processing proceeds to Step S72.

In Step S72, the carousel processor 35 acquires the metafile from the data stream, and provides it to the metafile processing section 71.

In Step S73, the metafile processing section 71 analyses the metafile acquired from the carousel processor 35, and provides a result of the analysis to the style selecting section 72.

In Step S74, based on the result of the analysis of the metafile by the metafile processing section 71, the style selecting section 72 performs style selection processing.

That is, in the style selection processing based on the result of the analysis of the metafile, similar to the style selection processing in FIG. 16 above, in accordance with the screen display state of the display section 12A, out of the styles a to f described in the metafile, one style is selected.

In Step S75, based on a result of the selection by the style selecting section 72, the BML browser 73 acquires, from the carousel processor 35, a BML document file including a display element corresponding to the selected style. It should be noted that to this BML document file, one or more style sheets correspond.

On the other hand, in Step S71, in the case where it is determined that the data broadcast processor 38 does not correspond to the metafile, the processing proceeds to Step S77. In Step S77, the BML browser 73 acquires, from the carousel processor 35, a BML document file having a corresponding style (e.g., the style a). Accordingly, for example, without having problems even with an existing portable communication terminal apparatus that does not correspond to the metafile, the viewing of the content becomes possible.

When the processing in Step S75 or S77 is complete, the processing returns to Step S12 in FIG. 11, and the processing in Step S13 and the subsequent processing are performed.

As mentioned above, in the case where the metafile method is employed, the metafile in which a list of styles of the data broadcast content to be provided is described is read, and a URL corresponding to the style selected from the list described in the metafile is specified. Then, a BML document file in a first page designated by the URL is acquired.

[Signaling Method]

Next, referring to FIGS. 21 to 24, as the first-stage style selection method, a case where the signaling method is employed will be described.

Figure 21:
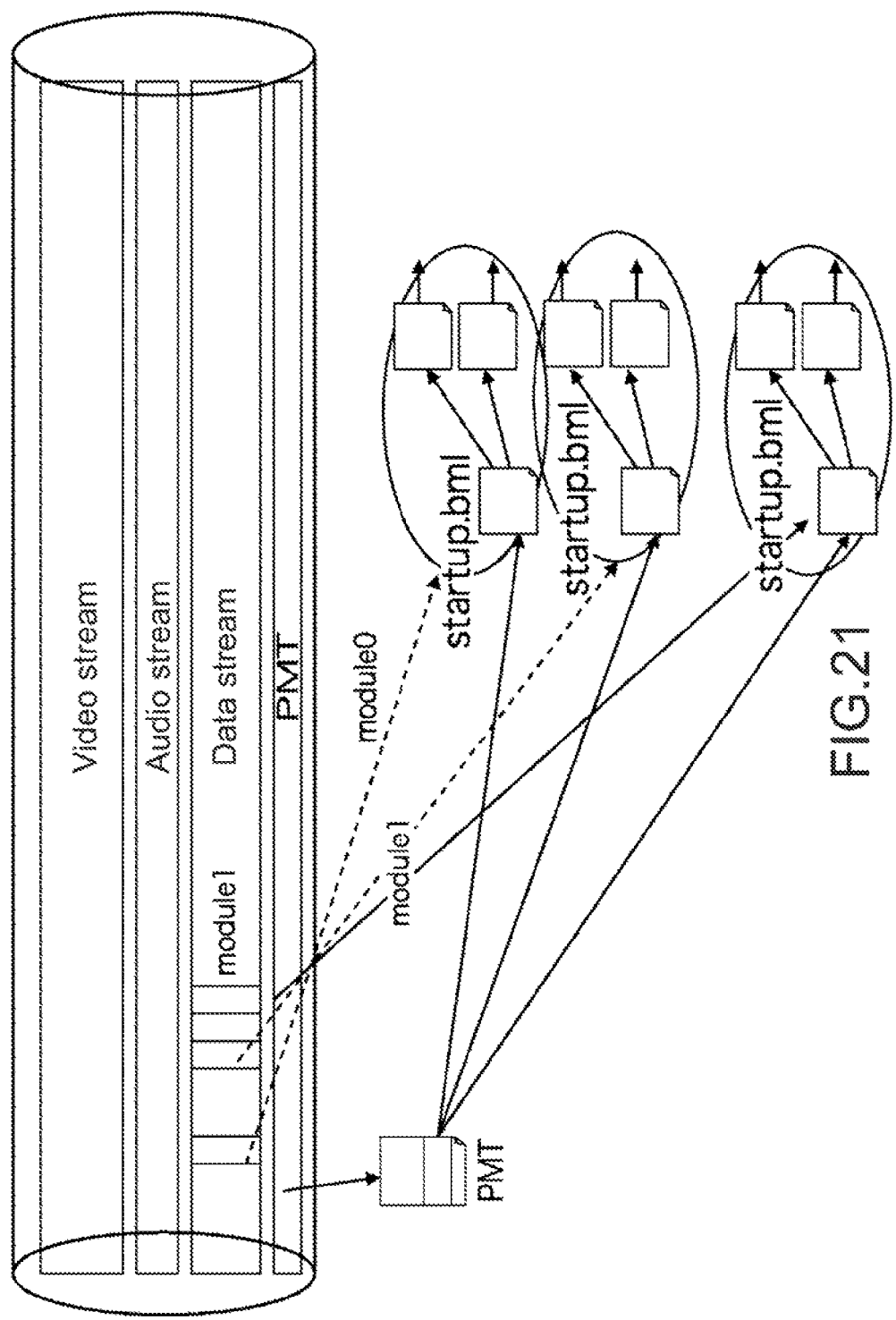
FIG. 21 is a diagram showing a configuration of a broadcast stream in a signaling method.

FIG. 21 is a diagram showing a configuration of a broadcast stream in the signaling method.

In the broadcast stream, a video stream, an audio stream, a data stream, and a stream for transmission control information are multiplexed.

The data stream contains module0, module1, module2, . . . , and in each module, Startup.bml is included.

Further, a PMT extracted from the stream for transmission control information contains a data broadcast style list descriptor. For each style number described in the data broadcast style list descriptor, a number of a module including a BML document file having the style is described.

FIG. 22 is a diagram showing an example of the data broadcast style list descriptor.

In data_broadcast_style_list_descriptor, descriptor_tag, descriptor_length, and number_of_style are described.

Descriptor_tag indicates a tag for identifying data broadcast_style_list descriptor.

Descriptor length indicates the number of the subsequent bytes.

Number_of_style indicates of the number of styles, and style_id indicates a style number. Further, module_id indicates a module number. That is, by the number of number_of_style, style_id and module_id are repeated, and thus, a number of a style to be provided is associated with a number of a module including a BML document file having the style.

Figure 23:
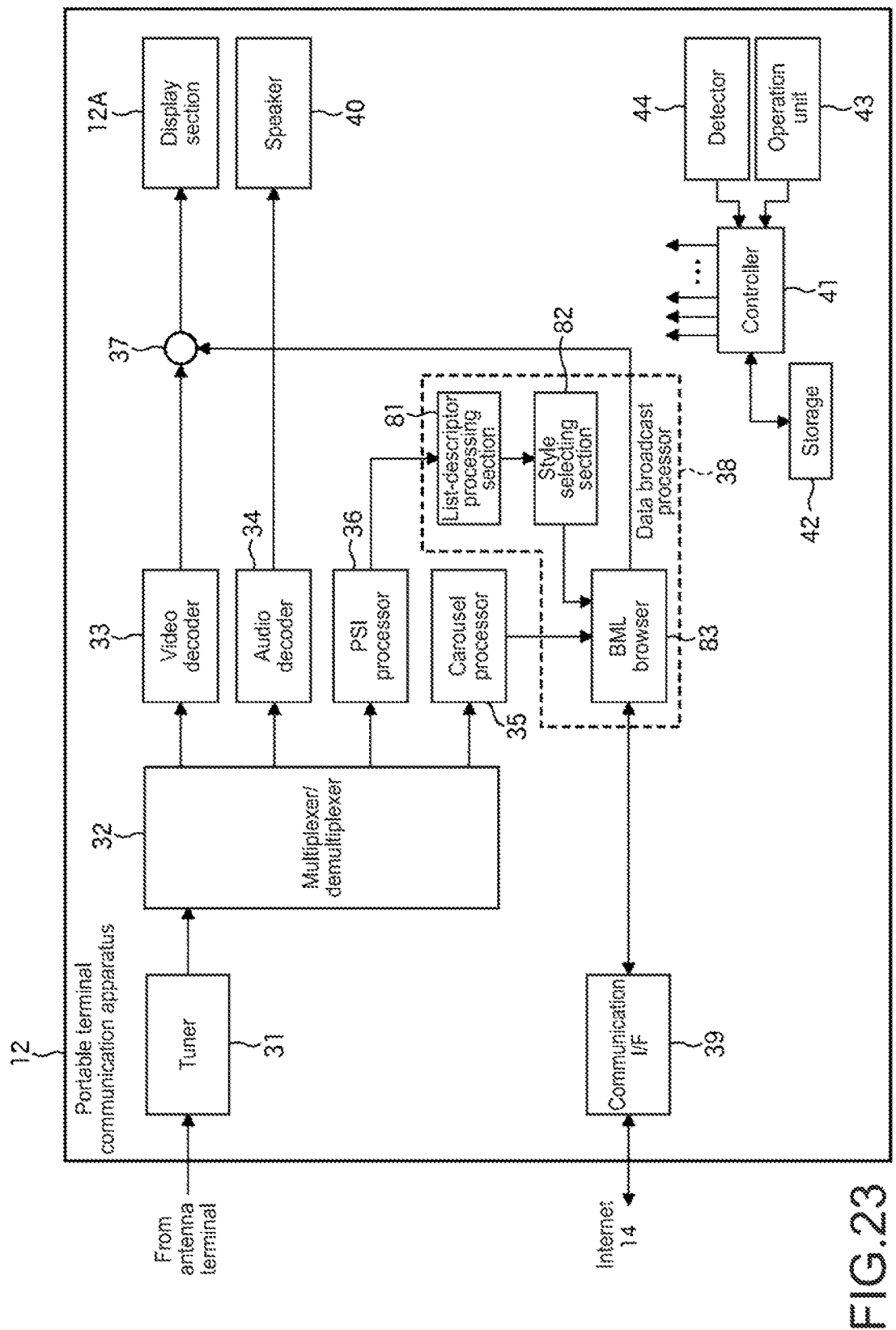
FIG. 23 is a diagram showing a configuration example of a portable terminal communication apparatus in the case where the signaling method is employed.

FIG. 23 is a diagram showing a configuration example of a portable terminal communication apparatus in the case where the signaling method is employed.

In the portable terminal communication apparatus 12 shown in FIG. 23, the same blocks as those of the portable terminal communication apparatus 12 shown in FIG. 10 are denoted by the same reference symbols. In the portable terminal communication apparatus 12 in the signaling method, as the data broadcast processor 38, a list-descriptor processing section 81, a style selecting section 82, and a BML browser 83 are provided.

The list-descriptor processing section 81 analyzes a data broadcast style list descriptor provided from the PSI processor 36, and provides a result of the analysis to the style selecting section 82.

Based on the result of the analysis of the data broadcast style list descriptor that is provided from the list-descriptor processing section 81, the style selecting section 82 performs the first-stage style selection processing, and provides a result of the selection to the BML browser 83.

Based on the result of the selection that is provided from the style selecting section 82, the BML browser 83 acquires a BML document file from the carousel processor 35. The BML browser 83 provides data of the acquired BML document file to the synthesizer 37 to be displayed on the display section 12A.

Further, in the case where the screen display state of the display section 12A is changed, the BML browser 83 performs the second-stage style selection processing, using the link method, the import method, or the medium method to be described later.

It should be noted that the portable terminal communication apparatus 12 shown in FIG. 23 basically has the same configuration as that of the portable terminal communication apparatus 12 shown in FIG. 10 except for the data broadcast processor 38, and thus description thereof will be omitted.

The portable terminal communication apparatus 12 shown in FIG. 23 is configured in the above-mentioned manner.

Figure 24:
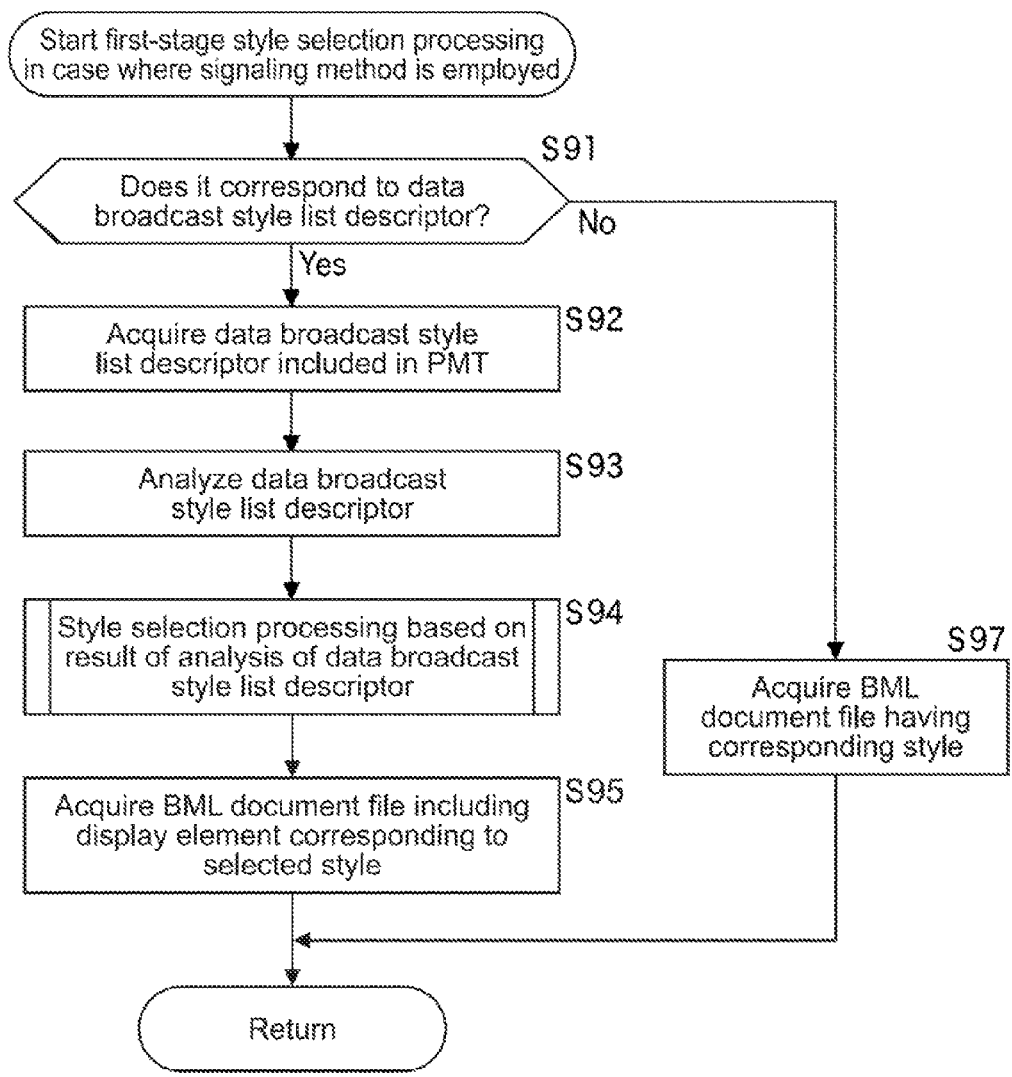
FIG. 24 is a flowchart for illustrating first-stage style selection processing in the case where the signaling method is employed.

Next, referring to a flowchart shown in FIG. 24, the first-stage style selection processing in the case where the signaling method is employed, which is performed by the portable terminal communication apparatus 12 shown in FIG. 23, will be described. This processing corresponds to Step S12 in FIG. 11.

In Step S91, the PSI processor 36 determines whether or not the data broadcast processor 38 corresponds to the data broadcast style list descriptor. In the case where it is determined that the data broadcast processor 38 corresponds to the data broadcast style list descriptor, the processing proceeds to Step S92.

In Step S92, the PSI processor 36 acquires the data broadcast style list descriptor included in the PMT, and provides it to the list-descriptor processing section 81.

In Step S93, the list-descriptor processing section 81 analyzes the data broadcast style list descriptor acquired from the PSI processor 36, and provides a result of the analysis to the style selecting section 82.

In Step S94, based on the result of the analysis of the data broadcast style list descriptor by the list-descriptor processing section 81, the style selecting section 82 performs style selection processing.

That is, in the style selection processing based on the result of the analysis of the data broadcast style list descriptor, similar to the style selection processing shown in FIG. 16 above, in accordance with the screen display state of the display section 12A, out of the styles a to f described in the data broadcast style list descriptor, one style is selected.

In Step S95, based on a result of the selection by the style selecting section 82, the BML browser 83 acquires, from the carousel processor 35, a BML document file including a display element corresponding to the selected style. It should be noted that to this BML document file, one or more style sheets correspond.

On the other hand, in Step S91, in the case where it is determined that the data broadcast processor 38 does not correspond to the data broadcast style list descriptor, the processing proceeds to Step S97. In Step S97, the BML browser 83 acquires, from the carousel processor 35, a BML document file having a corresponding style (e.g., the style a). Accordingly, for example, without having problems even with an existing portable communication terminal apparatus that does not correspond to the data broadcast style list descriptor, the viewing of the content becomes possible.

When the processing in Step S95 or S97 is complete, the processing returns to Step S12 in FIG. 11, and the processing in Step S13 and the subsequent processing are performed.

As mentioned above, in the case where the signaling method is employed, a number of the module corresponding to the style selected from the list described in the data broadcast style list descriptor included in the PMT is specified. Then, a BML document file in a first page that is included in a module having the specified number is acquired.

[Second-Stage Style Selection Processing]

Next, referring to FIGS. 25 to 33, the details of the second-stage style selection processing will be described.

As mentioned above, in the case where the data broadcast content corresponds to a plurality of display styles, for single content, a plurality of style sheets can be designated. Therefore, by selecting a display style for each content by the first-stage style selection processing, and then selecting a style sheet of the content by the second-stage style selection processing, it becomes possible to select a more optimal style.

This second-stage style selection processing is performed, for example, in the case where the data broadcast content selected during the selection of the channel corresponds to a plurality of style sheets, or in the case where the screen display state of the display section 12A is changed. Further, as a second-stage style selection method, by extending a medium type of CSS (Cascading Style Sheets), it is possible to use, as mentioned above, the link method, the import method, or the medium method. In this regard, hereinafter, these three methods will be described.

[Link Method]

First, referring to FIGS. 25 to 27, a case where as the second-stage style selection method, the link method is employed will be described.

Figure 25:
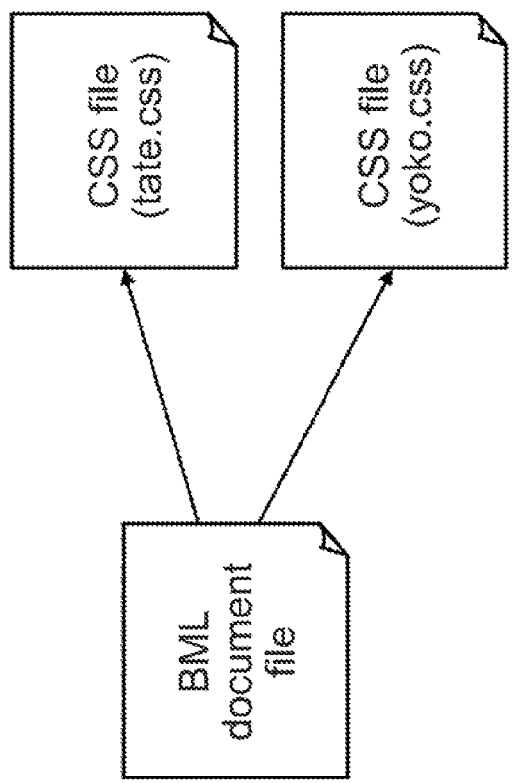
FIG. 25 is a diagram for illustrating an outline of a link method.

FIG. 25 is a diagram showing an outline of the link method.

In the link method, a CSS file designated by a Link element described in a BML document file is referred to, and a style of content is changed based on, for example, information on a screen size (resolution) of content for each style that is designated by the CSS file.

As shown in a description example in FIG. 25, in the Link element within the BML document file, as its attributes, a rel attribute, a type attribute, a href attribute, a media attribute are set.

The media attribute designates a medium type. For attribute values for designating the medium type, "portlait," "landscape," "separated," and "overlaid" are set.

That is, for the media attribute, as the attribute values, "portlait" is set in the case of the vertically long display, and "landscape" is set in the case of the horizontally long display. Further, "separated" is set in the case of the separate arrangement, and "overlaid" is set in the case of the overlay arrangement. By setting those attribute values, the medium types corresponding to the screen display direction and the arrangement method are designated.

For example, as shown in FIG. 26, in the case where as the attribute values of the media attribute, "landscape" and "overlaid" are set, "style_f.css" is set for the href attribute. For style_f.css, as the resolution of the content, width: 640 px, height: 480 px (resolution 640*480) is set. This style corresponds to the style f described above.

Further, in the case where as the attribute values of the media attribute, "portlait" and "separated" are set, "style_a.css" is set for the href attribute. For style_a.css, as the resolution of the content, width: 240 px, height: 480 px resolution 240*480) is set. This style corresponds to the style a described above.

In addition, in the case where as the attribute values of the media attribute, "landscape" and "separated" are set, "style_e.css" is set for the href attribute. For style_e.css, as the resolution of the content, width: 640 px, height: 960 px (resolution 640*960 is set. This style corresponds to the style e described above.

In this manner, by reading an external style sheet corresponding to each medium type, it is possible to acquire a screen size for each style that is described in each external style sheet.

Next, referring to a flowchart shown in FIG. 27, second-stage style selection processing in the case where the link method is employed will be described. This processing corresponds to Step S14 or S17 in FIG. 11.

It should be noted that although the second-stage style selection processing may be performed by any of the portable terminal communication apparatuses 12 shown in FIGS. 10, 14, 19, and 23, now, as a representative, a case where the second-stage style selection processing is performed by the portable terminal communication apparatus 12 shown in FIG. 14 will be described.

In Step S111, the BML browser 61 sends an inquiry to the controller 41, to thereby acquire information on the screen display direction and the screen display setting of the display section 12A.

In Step S112, based on the acquired information on the screen display direction and the screen display setting of the display section 12A, the BML browser 61 selects a style sheet designated by the Link element. For example, in the case where the screen display direction of the display section 12A is the horizontally long display and the screen display setting (arrangement method) is the overlay arrangement, as shown in FIG. 26, attribute values of the media attribute become "landscape" and "overlaid," and thus "style_f.css" designated by the href attribute is selected.

In Step S113, the BML browser 61 reads the style sheet corresponding to the BML document file, and performs display processing using a screen layout corresponding to description content thereof.

Accordingly, on the display section 12A, the video content and the data broadcast content are displayed in an optimal display mode corresponding to the screen display state.

When the processing in Step S113 is complete, the processing returns to Step S14 or S17 in FIG. 11, and the processing in this step and the subsequent processing are performed.

As mentioned above, in the case where the link method is employed, a medium type corresponding to the screen display direction and the screen display setting is specified, and based on the medium type, a CSS file designated by the Link element is referred to. Then, a screen size for each style that is described in the CSS file is acquired, and the style of the content is changed.

[Import Method]

Figure 30:
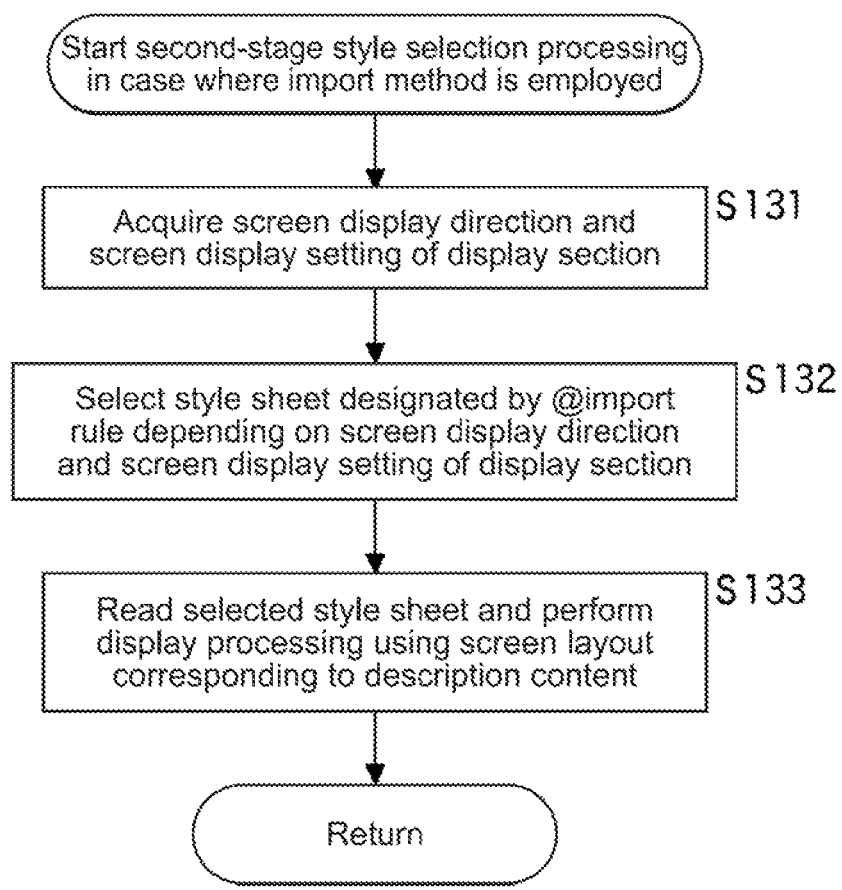
FIG. 30 is a flowchart for illustrating second-stage style selection processing in the case where the import method is employed.

Next, referring to FIGS. 28 to 30, a case where as the second-stage style selection method, the import method is employed will be described.

Figure 28:
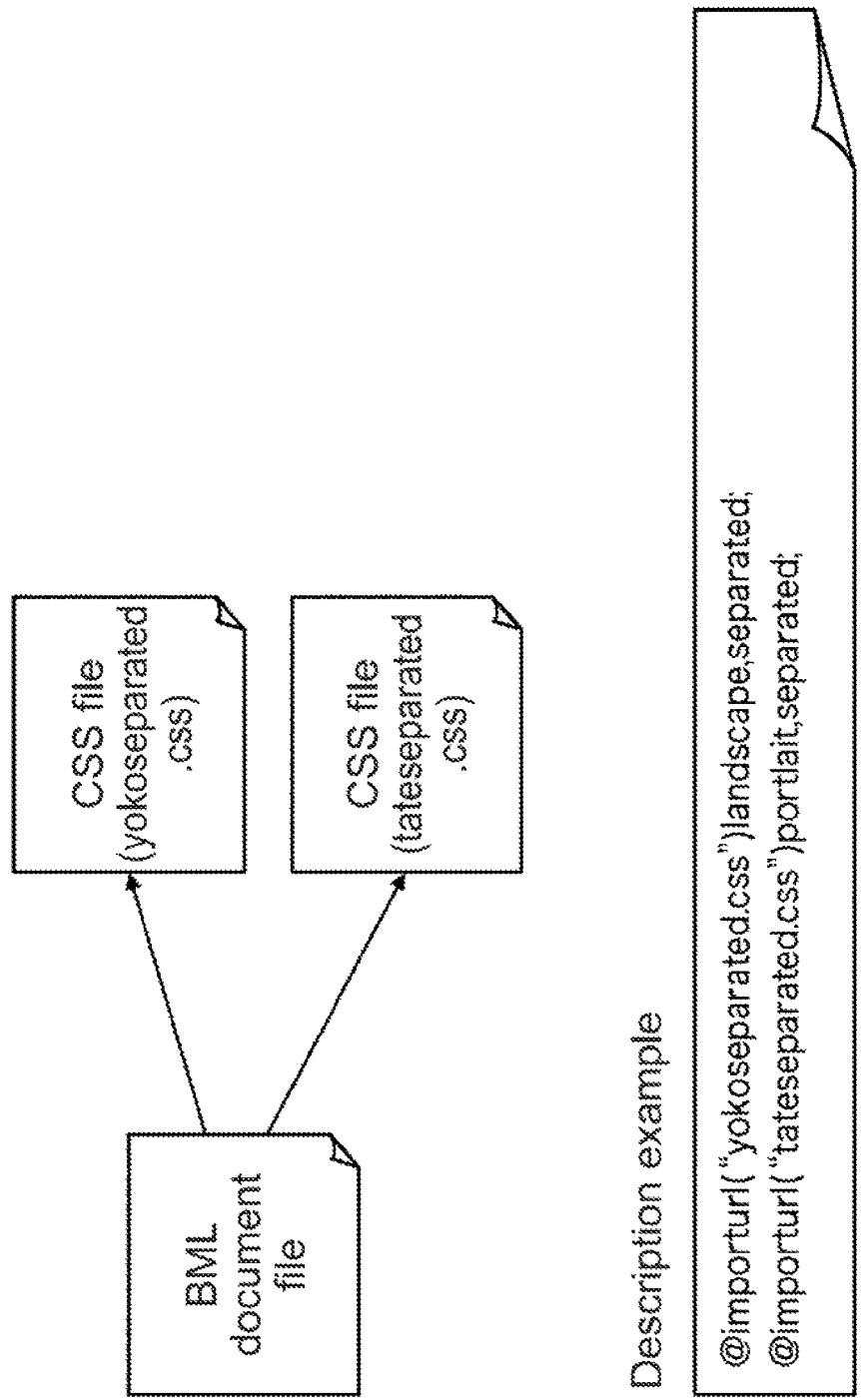
FIG. 28 is a diagram for illustrating an outline of an import method.

FIG. 28 is a diagram showing an outline of the import method.

In the import method, a CSS file for each medium type designated by an @import rule of a Style element described in a BML document file is referred to, and the style of the content is changed based on, for example, information on a screen size (resolution) of content for each style that is designated by the CSS file.

As shown in a description example in FIG. 28, in the @import rule, medium types including "portlait," "landscape," "separated," "overlaid," and the like can be designated.

That is, in the @import rule, "portlait" is set in the case of the vertically long display, and "landscape" is set in the case of the horizontally long display. Further, "separated" is set in the case of the separate arrangement, and "overlaid" is set in the case of the overlay arrangement. By setting those values, the medium types corresponding to the screen display direction and the arrangement method are designated.

For example, as shown in FIG. 29, in the case where "portlait" and "overlaid" are set, as a URL of the @import rule, "port-over.css" is set. Although not shown in the figure, in port-over.css, information on the resolution of the content is described.

Further, in the case where "landscape" and "separated" are set, as the URL of the @import rule, "land-separate.css" is set. In addition, in the case where "portlait," "landscape," and "overlaid" are set, as the URL of the @import rule, "port-land-over.css" is set. Also in land-separate.css and port-land-over.css, the information on the resolution of the content is described.

In this manner, by reading an external style sheet corresponding to each medium type, a screen size for each style that is described in each external style sheet can be acquired.

Next, referring to a flowchart shown in FIG. 30, second-stage style selection processing in the case where the import method is employed will be described. This processing corresponds to Step S14 or S17 in FIG. 11.

It should be noted that although the second-stage style selection processing may be executed any of the portable terminal communication apparatuses 12 shown in FIGS. 10, 14, 19, and 23, now, as a representative, a case where the second-stage style selection processing is performed by the portable terminal communication apparatus 12 shown in FIG. 14 will be described.

Figure 27:
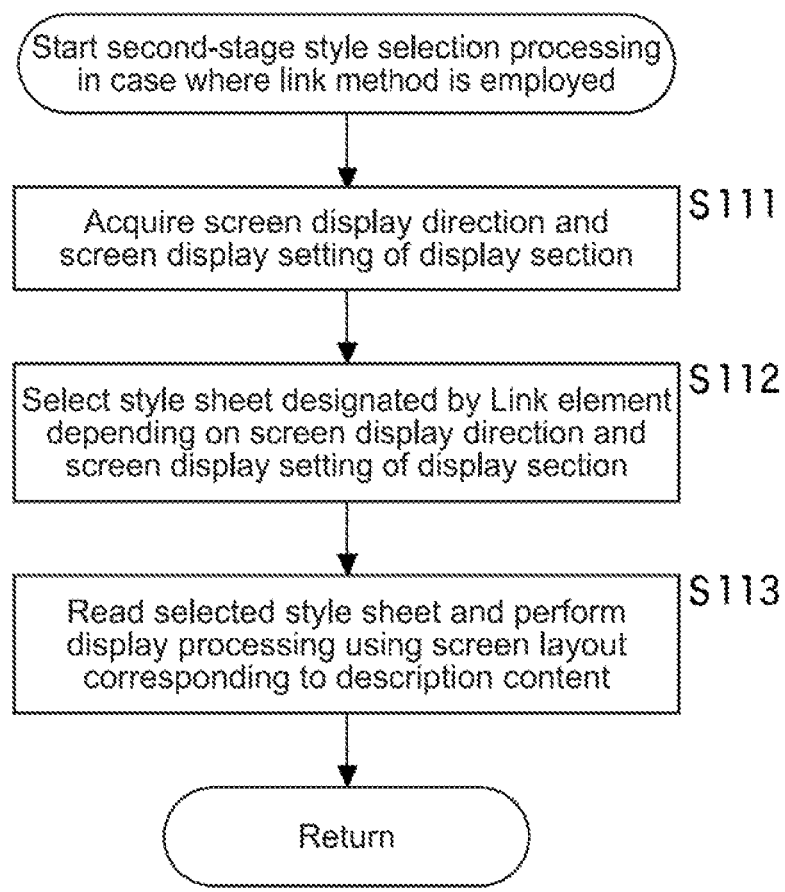
FIG. 27 is a flowchart for illustrating second-stage style selection processing in the case where the link method is employed.

In Step S131, similar to Step S111 in FIG. 27, the BML browser 61 acquires information on the screen display direction and the screen display setting of the display section 12A.

In Step S132, based on the acquired information on the screen display direction and the screen display setting of the display section 12A, the BML browser 61 selects a style sheet designated by the @import rule. For example, in the case where the screen display direction of the display section 12A is the horizontally long display and the screen display setting (arrangement method) is the separate arrangement, as shown in FIG. 29, "landscape" and "separated" are applied, and thus "land-separate.css" designated by the URL of the @import rule is selected.

In Step S133, similar to Step S113 in FIG. 27, the style sheet corresponding to the BML document file is read, and display processing using a screen layout corresponding to description content thereof is performed. Then, on the display section 12A, the video content and the data broadcast content are displayed in an optimal display mode corresponding to the screen display state.

When the processing in Step S133 is complete, the processing returns to Step S14 or S17 in FIG. 11, and the processing in this step and the subsequent processing are performed.

As mentioned above, in the case where the import method is employed, medium types corresponding to the screen display direction and the screen display setting are specified, and based on the medium types, a CSS file designated by the @import rule is referred to. Then, a screen size for each style that is described in the CSS file is acquired, and the style of the content is changed.

[Medium Method]

Figure 33:
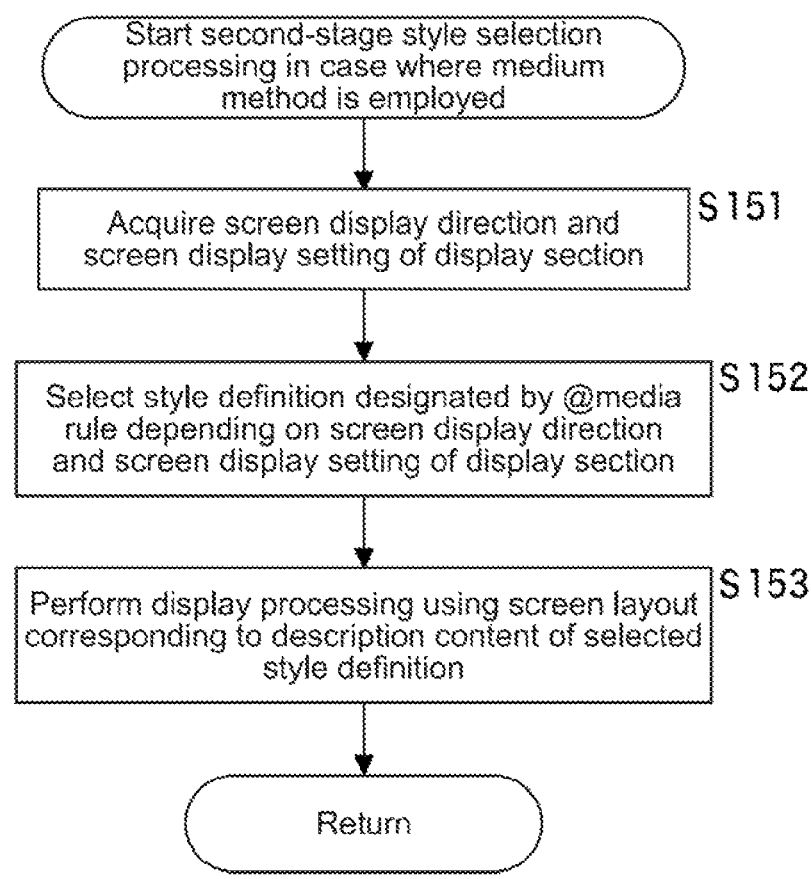
FIG. 33 is a flowchart for illustrating second-stage style selection processing in the case where the medium method is employed.

Next, referring to FIGS. 31 to 33, a case where as the second-stage style selection method, the medium method is employed will be described.

Figure 31:
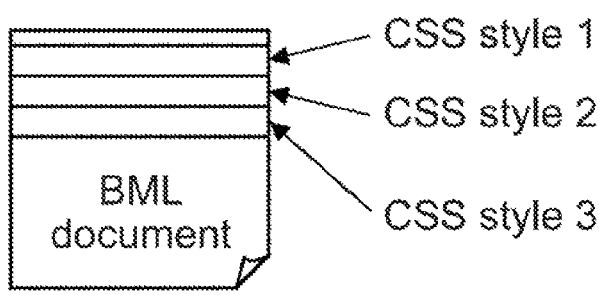
FIG. 31 is a diagram for illustrating an outline of a medium method.

FIG. 31 is a diagram showing an outline of the medium method.

In the medium method, by describing a CSS for each medium type by using the @media rule of the Style element described in the BML document file in advance, the style of the content is changed based on the information on the screen size (resolution) of content for each style defined by the CSS.

In FIG. 31, as shown in a description example corresponding to a CSS style 1 to a CSS style 3 described in a BML document file, in the @media rule, medium types including "portlait," "landscape," "separated," "overlaid," and the like can be designated.

That is, in the @media rule, "portlait" is set in the case of the vertically long display, and "landscape" is set in the case of the horizontally long display. Further, "separated" is set in the case of the separate arrangement, and "overlaid" is set in the case of the overlay arrangement. By setting those values, the medium types corresponding to the screen display direction and the arrangement method are designated.

For example, as shown in FIG. 32, in the case where as the medium types, "landscape" and "overlaid" are set, in a body element of the @media rule, as the resolution of the content, width: 640 px, height: 480 px (resolution 640*480) is defined.

Further, in the case where "landscape" and "separated" are set, for the body element of the @media rule, as the resolution of the content, width: 640 px, height: 960 px (resolution 640*960) is defined. In addition, in the case where "portlait" and "separated" are set, in the body element of the @media rule, as the resolution of the content, width: 240 px, height: 480 px (resolution 640*480) is defined.

In this manner, by defining the style corresponding to each medium type by using the CSS described in the BML document file, it is possible to acquire a screen size for each style corresponding to the medium type.

Next, referring to a flowchart shown in FIG. 33, second-stage style selection processing in the case where the medium method is employed will be described. This processing corresponds to Step S14 or S17 in FIG. 11.

It should be noted that although the second-stage style selection processing may be performed by any of the portable terminal communication apparatuses 12 shown in FIGS. 10, 14, 19, and 23, now, as a representative, a case where the second-stage style selection processing is performed by the portable terminal communication apparatus 12 shown in FIG. 14 will be described.

In Step S151, similar to Step S111 in FIG. 27, the BML browser 61 acquires information on the screen display direction and the screen display setting of the display section 12A.

In Step S152, based on the acquired information on the screen display direction and the screen display setting of the display section 12A, the BML browser 61 selects a style defined by a CSS described in a BML document file. For example, in the case where the screen display direction of the display section 12A is the vertically long display and the screen display setting (arrangement method) is the separate arrangement, as shown in FIG. 32, "portlait" and "separated" are applied, and thus as a style definition, width: 240 px, height: 480 px (resolution 640*480) is selected.

In Step S153, the BML browser 61 performs display processing using a screen layout corresponding to description content of the style definition corresponding to the BML document file. Accordingly, on the display section 12A, the video content and the data broadcast content are displayed in an optimal display mode corresponding to the screen display state.

When the processing in Step S153 is complete, the processing returns to Step S14 or S17 in FIG. 11, and the processing in this step and the subsequent processing are performed.

As mentioned above, in the case where the medium method is employed, medium types corresponding to the screen display direction and the screen display setting are specified.

Then, depending on the medium type, a screen size for each style defined by a CSS described in a BML document file is acquired, and the style of the content is changed.

[Specific Example of Screen Transition]

Next, referring to FIG. 34, a specific example of a screen transition of the data broadcast content provided by the service provider will be described.

As the data broadcast content, there are, for example, items (information items) on program explanation, news, weather news, and the like. For example, a BML document file in a first page constitutes a menu screen for selecting these information items. As a method for displaying the BML document file in the first page, there are the script method, the metafile method, or the signaling method as described above.

As the menu screen, there are a BML document file for the overlay arrangement and a BML document file for the separate arrangement. The BML document file for the overlay arrangement serves to display the information items (e.g., graphics including square, triangle, and the like in the figure) associated with the video content (video in the figure) while being overlaid on the video content. The BML document file for the separate arrangement serves to display those information items separately from the video content. Further, with the BML document file for the overlay arrangement, associated is "Overlaid.css" as a CSS file. With the BML document file for the separate arrangement, associated are "portlait.css" for the vertically long display and "landscape.css" for the horizontally long display as CSS files.

By the first-stage style selection processing performed during the selection of the channel, a display style corresponding to either the overlay arrangement or the separate arrangement is selected, and a BML document file corresponding to this style is executed as described above. In the case of the BML document file for the overlay arrangement, only one CSS file is present, and thus based on this CSS file, an overlay-arrangement menu screen (A in the figure) is displayed.

On the other hand, in a BML document file for the separate arrangement, two CSS files are present, and thus, by the second-stage style selection processing in addition to the first-stage style selection processing, a CSS file for either the vertically long display or the horizontally long display is selected in accordance with the screen display direction of the display section 12A, and a separate-arrangement menu screen (B in the figure) is displayed.

Under a state in which the menu screen is being displayed, when the screen display direction of the display section 12A is changed, by the second-stage style selection processing, the style of the menu screen being displayed is selected. For example, switching between the overlay arrangement and the separate arrangement is performed. It should be noted that in the case where the first-stage style selection processing is performed by the metafile method or the signaling method, by performing the first-stage style selection processing at a point in time when the screen display direction is changed, the style of the content may be selected again. Even if the style is selected again, the display screen is the menu screen, and thus it is considered that a sense of discomfort is not caused.

When a particular information item is selected on the menu screen, a detailed-information screen associated with this information item is displayed. Here, on the detailed-information screen, an amount of information to be displayed increases, and thus it is not reasonable to perform the overlay arrangement in the horizontally long display. Therefore, when a particular information item is selected on the menu screen, it is set to display a single piece of content in the separate arrangement. For example, in the case where the overlay-arrangement menu screen (A in the figure) is the horizontally long display, when an information item is selected on the menu screen, a transition to a horizontally-long-type detailed information screen (C in the figure) displayed using a BML document file for the separate arrangement is made. In this case, for example, the video content is temporarily hidden, and the horizontally-long-type detailed information screen (C in the figure) is displayed in a full-screen mode. Further, by performing a predetermined operation, it is also possible to change from the horizontally-long-type detailed information screen to a full-screen display of the video content.

After that, in order to change the screen display direction from the horizontally long display to the vertically long display, the second-stage style selection processing is performed to change the style sheet. As a result, the horizontally-long-type detailed information screen (C in the figure) or the full-screen display of the video content changes to a vertically-long-type detailed information screen (D in the figure). In this case, the vertically-long-type detailed information screen (D in the figure) is the vertically long display, and thus the video content and the detailed information screen are displayed at the same time.

In addition, in order to return from the horizontally-long-type detailed information screen (C in the figure) or the vertically-long-type detailed information screen (D in the figure) to the menu screen, the first-stage style selection processing is performed to select the style of the content again. After that, the second-stage style selection processing is performed, and the menu screen is displayed.

Figure 34:
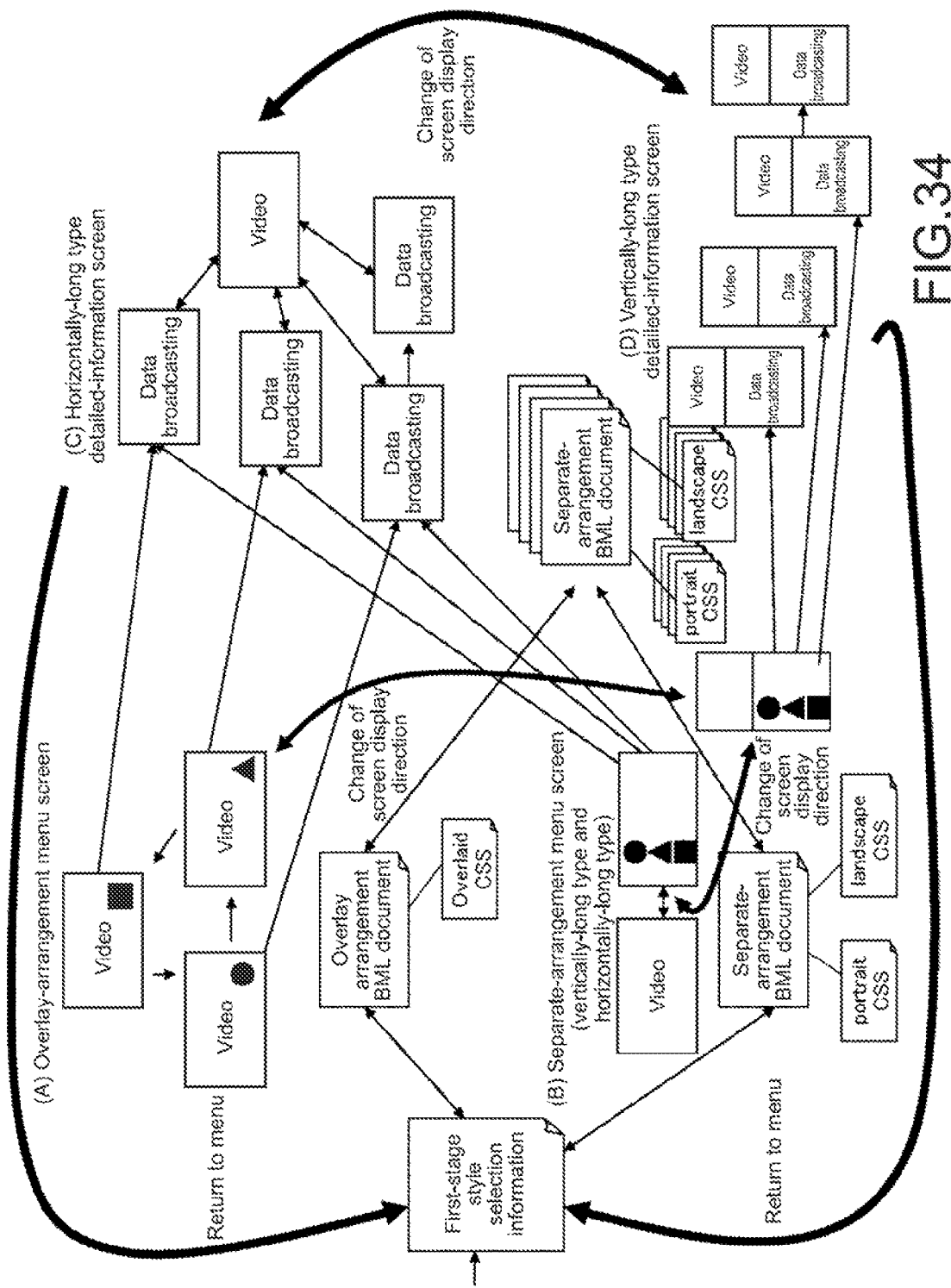
FIG. 34 is a diagram showing a specific example of screen transition.

It should be noted that the screen transition shown in FIG. 34 is merely an example, and depending on, for example, the contents of the data broadcast content provided by each service provider or the screen display state of the display section 12A, the screen transition may be varied.

As mentioned above, in the portable terminal communication apparatus 12, when a channel is selected, the first-stage style selection section 51 selects a display style for each of the data broadcast content in accordance with the screen display state of the display section. Further, in the case where the data broadcast content corresponding to the style selected by the first-stage style selection section 51 corresponds to a plurality of display styles, the second-stage style selection section 52 selects one display style out of the plurality of display styles. Then, the data broadcast content corresponding to the style selected by the first-stage style selection section 51 or the second-stage style selection section 52 is displayed on the display section. Accordingly, in accordance with the screen display state of the display section, the display mode of the data broadcast content can be changed, and thus it is possible to perform screen display in an optimal display mode.

It should be noted that in the above description, the portable telephone, the smart phone, and the tablet PC are exemplified as the portable terminal communication apparatuses 12, it is also possible to apply the present technology to another portable terminal communication apparatus capable of receiving digital television broadcast signals, for example, a PDA (Personal Digital Assistant) or a game machine.

Further, in the above description, the BML document file created in the BML being the description language for data broadcasting is exemplified as the data broadcast content. However, the data broadcast content is not limited to that created in the BML, and it is also possible to create the data broadcast content in another description language such as an HTML (HyperText Markup Language).

Further, in the above description, the six styles including the styles a to f are exemplified. However, it is possible to set other styles depending on a combination of the screen resolution, the screen display direction, and the arrangement method. Further, as conditions for determining a style, conditions other than the screen resolution, the screen display direction, and the arrangement method may be set. In addition, the priorities for the styles are also merely examples, and the priority may be appropriately changed. That is, such policy setting can be basically different for each model of terminals manufactured by each manufacturer, and a suitable policy will be set for each model of the terminals.

In addition, in the above description, during the selection of the channel, the first-stage style selection processing and the second-stage style selection processing are performed, and when the screen display state of the display section 12A is changed, the second-stage style selection processing is performed. However, the first-stage style selection processing and the second-stage style selection processing are independent processing, and thus the processing can be separately performed.

[Explanation of Computer to which Present Technology is Applied]

The series of processing described above may be performed by hardware or software. In the case where the series of processing is performed by the software, a program configuring the software is installed into a general-purpose computer or the like.

Figure 35:
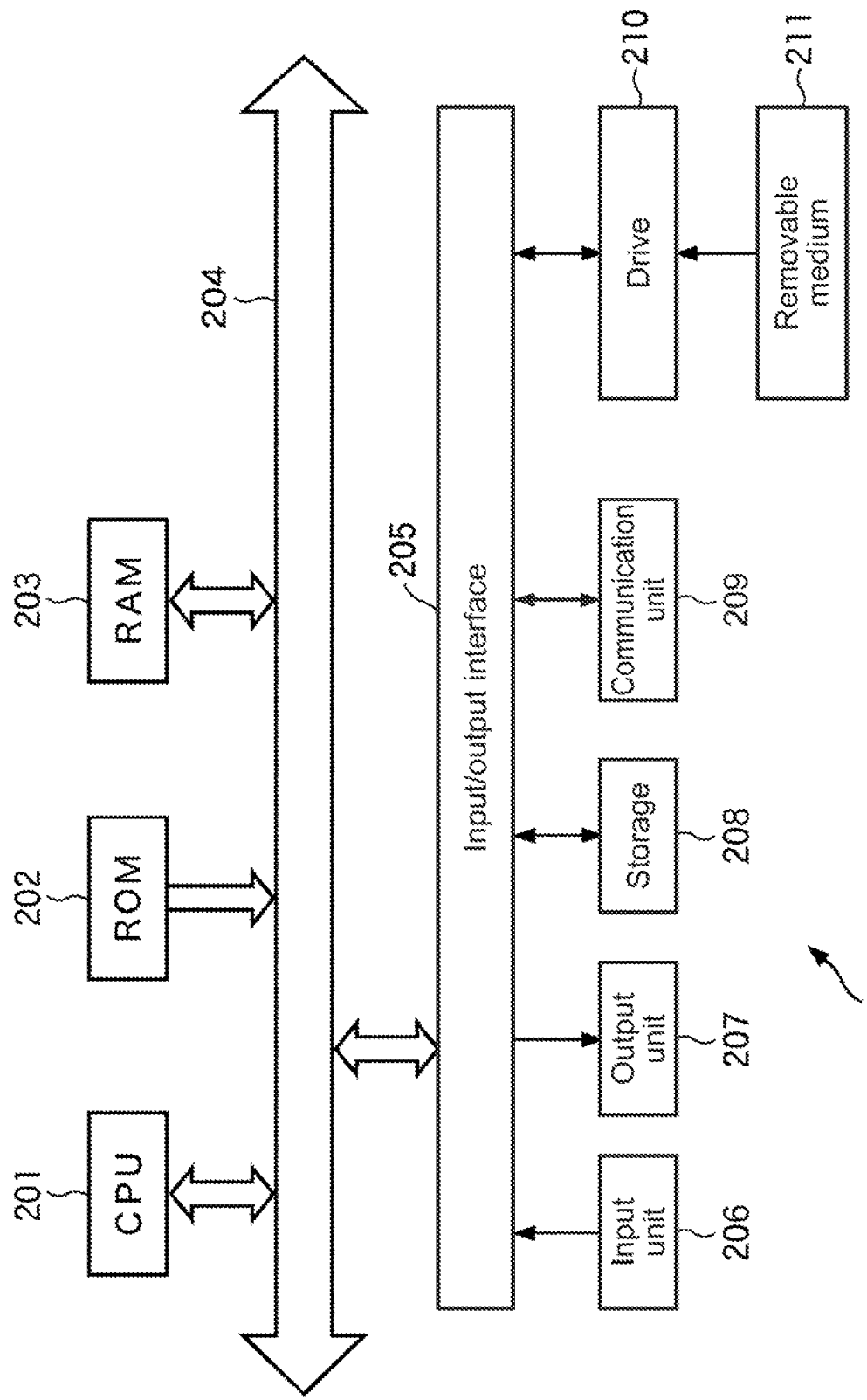
FIG. 35 is a diagram showing a configuration example of a computer.

In this regard, FIG. 35 shows a configuration example according to an embodiment of a computer into which a program for executing the series of processing described above is installed.

The program can be stored in advance in a storage 208 such as a built-in hard-disk of a computer 200 or a ROM (Read Only Memory) 202.

Alternatively, the program may be stored (recorded) temporarily or permanently in a removable medium 211 including a flexible disk, a CD-ROM (Compact Disc Read Only Memory), an MO (Magneto Optical) disc, a DVD (Digital Versatile Disc), a magnetic disk, a semi-conductor memory, and the like. This removable medium 211 can be provided as so-called packaged software.

It should be noted that rather than installing the program into the computer 200 from the above-mentioned removable medium 211, the program may be installed in the storage 208 in such a manner that it is transferred in a wireless manner from a download site to the computer 200 via a satellite for digital satellite broadcasting or it is transferred in a wired manner to the computer 200 via a network such as a LAN (Local Area Network) or the Internet, and then in the computer 200, the program thus transferred is received by a communication unit 209.

The computer 200 has a built-in CPU (Central Processing Unit) 201. To the CPU 201, via a bus 204, an input/output interface 205 is connected. When the CPU 201 receives an instruction input by, for example, the user operating an input unit 206 including a keyboard, a mouse, a microphone, and the like via the input/output interface 205, the CPU 201 executes, according to this instruction, the program stored in the ROM 202. Alternatively, the CPU 201 loads, to a RAM (Random Access Memory) 203, a program stored in the storage 208, a program transferred from the satellite or the network, received by the communication unit 209, and installed into the storage 208, or a program read out from the removable medium 211 mounted on a drive 210 and installed into the storage 208, and executes those programs. Accordingly, the CPU 201 executes the processing according to the flowchart described above or the processing performed by the configuration of the block diagram described above. Then, the CPU 201 outputs a result of the processing to an output unit 207 including an LCD (Liquid Crystal Display), the speaker, and the like, or sends it from the communication unit 209, for example, via the input/output interface 205 depending on needs, and records it in the storage 208, for example.

Herein, processing steps of describing programs for causing the computer to execute various types of processing do not necessarily need to be processed in time line in the order described as the flowchart. The processing steps also include processing executed in parallel or individually (e.g., parallel processing or processing by object).

Alternatively, the program may be processed by a single computer or a plurality of computers in distributed processing. In addition, the program may be transferred to a remote computer for execution.

It should be noted that herein, the system refers to the entire apparatus including a plurality of apparatuses.

In addition, embodiments of the present technology are not limited to the above-mentioned embodiments, but various modifications can be made without departing from the gist of the present technology.

The present disclosure contains subject matter related to that disclosed in Japanese Priority Patent Application JP 2011-103556 filed in the Japan Patent Office on May 6, 2011, the entire content of which is hereby incorporated by reference.

What is claimed is:

1. A reception apparatus, comprising:
a reception unit configured to receive a broadcast stream at least including a data stream for data broadcasting;
a first style selector configured to select a display style for each of data broadcast content acquired from the broadcast stream received by the reception unit;
a second style selector configured to select, when the data broadcast content corresponding to the style selected by the first style selector corresponds to a plurality of display styles, one display style out of the plurality of display styles; and
a display unit configured to display the data broadcast content corresponding to the style selected by the first style selector or the second style selector.

2. The reception apparatus according to claim 1, wherein the first style selector selects the display style for each of the data broadcast content, using any one method of a script method of selecting the style by executing a script described in a file to be first read out from the data stream, a metafile method of selecting the style from a list of styles described in a metafile that is acquired from the data stream, and a signaling method of selecting the style from a list of styles acquired from a stream for transmission control information that is included in the broadcast stream, and
the second style selector selects the one display style out of the plurality of display styles, using any one method of a link method of selecting the style by using information on screen display that is acquired from an external file being at a link destination designated in a description language of the data broadcast content being displayed, an import method of selecting the style by using information on screen display that is acquired from an external file imported in accordance with a predetermined rule in the description language, and a medium method of selecting the style by using information on screen display that is defined by a predetermined rule in the description language.

3. The reception apparatus according to claim 2, wherein the first style selector selects the display style for each of the data broadcast content in accordance with a screen display direction or screen display setting of the display unit when a channel of the video content that is acquired from a video stream included in the broadcast stream is selected.

4. The reception apparatus according to claim 3, wherein the first style selector selects the one display style out of the plurality of display styles selectable in accordance with a priority set in advance.

5. The reception apparatus according to claim 4, wherein the screen display direction is either vertically long display in which the screen display of the display unit is vertically long or horizontally long display in which the screen display of the display unit is horizontally long.

6. The reception apparatus according to claim 4, wherein the screen display setting is setting of an arrangement method for the content, by which either separate arrangement in which the video content and the data broadcast content are separately arranged or overlay arrangement in which the video content and the data broadcast content are arranged in an overlaid state is set.

7. The reception apparatus according to claim 2, wherein the second style selector selects, when a screen display state of the display unit is changed, the one display style out of the plurality of display styles to which the data broadcast content being displayed corresponds.

8. The reception apparatus according to claim 7, wherein the second style selector selects, when the screen display direction or the screen display setting of the display unit is changed, the one display style out of the plurality of display styles to which the data broadcast content being displayed corresponds, in accordance with the screen display direction or the screen display setting of the display unit.

9. The reception apparatus according to claim 8, wherein the screen display direction is either vertically long display in which the screen display of the display unit is vertically long or horizontally long display in which the screen display of the display unit is horizontally long.

10. The reception apparatus according to claim 8, wherein the screen display setting is setting of an arrangement method for the content, by which either separate arrangement in which video content and the data broadcast content are separately arranged or overlay arrangement in which the video content and the data broadcast content are arranged in an overlaid state are set, the video content being acquired from the video stream included in the broadcast stream.

11. The reception apparatus according to claim 2, wherein the broadcast stream is an MPEG-TS (Moving Picture Experts Group 2-Transport Stream), and the list of styles in the signaling method is acquired from a PMT (Program Mapped Table) included in the stream for transmission control information.

12. A reception method, comprising by a reception apparatus:

controlling reception of a broadcast stream at least including a data stream for data broadcasting;

selecting a display style for each of data broadcast content acquired from the received broadcast stream;

selecting, when the data broadcast content corresponding to the selected style corresponds to a plurality of styles, one style out of the plurality of styles; and controlling display of the data broadcast content corresponding to the selected style.

13. A program for controlling a reception apparatus, the program causing a computer to execute processing including a reception control step of controlling reception of a broadcast stream at least including a data stream for data broadcasting, a first style selection step of selecting a display style for each of data broadcast content acquired from the broadcast stream received by processing in the reception control step, a second style selection step of selecting, when the data broadcast content corresponding to the style selected by processing in the first style selection step corresponds to a plurality of styles, one style out of the plurality of styles, and a display control step of controlling display of the data broadcast content corresponding to the style selected by the processing in the first style selection step or processing in the second style selection step.

* * * * *